(12) United States Patent
Lynam

(10) Patent No.: US 8,128,243 B2
(45) Date of Patent: *Mar. 6, 2012

(54) EXTERIOR SIDEVIEW MIRROR SYSTEM

(75) Inventor: Niall R. Lynam, Holland, MI (US)

(73) Assignee: Donnelly Corporation, Holland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/911,274

(22) Filed: Oct. 25, 2010

(65) Prior Publication Data

US 2011/0051270 A1    Mar. 3, 2011

Related U.S. Application Data

(60) Continuation of application No. 12/851,045, filed on Aug. 5, 2010, now Pat. No. 7,934,843, which is a continuation of application No. 12/197,666, filed on Aug. 25, 2008, now Pat. No. 7,842,154, which is a division of application No. 10/709,434, filed on May 5, 2004, now Pat. No. 7,420,756.

(60) Provisional application No. 60/471,872, filed on May 20, 2003.

(51) Int. Cl.
G02B 5/08 (2006.01)

(52) U.S. Cl. ............................................. 359/866

(58) Field of Classification Search .............. 359/866, 359/868, 872, 877, 883
See application file for complete search history.

(56) References Cited

U.S. PATENT DOCUMENTS

| | | | |
|---|---|---|---|
| 1,114,559 A | 10/1914 | Weed | |
| 1,672,559 A | 6/1928 | Doble | |
| RE17,274 E | 4/1929 | Porter | |
| 2,135,262 A | 11/1938 | Schumacher | |
| 2,263,382 A | 11/1941 | Gotzinger | |
| 2,514,989 A | 7/1950 | Buren | |
| 2,580,014 A | 12/1951 | Gazda | |
| 2,636,419 A | 4/1953 | Kerr | |
| 2,778,273 A | 1/1957 | Fellmeth | |
| 2,890,539 A | 6/1959 | Holt | |
| 2,911,177 A | 11/1959 | West | |
| 3,104,274 A | 9/1963 | King | |
| 3,131,250 A | 4/1964 | Ely | |
| 3,146,296 A | 8/1964 | Fischer | |
| 3,170,985 A | 2/1965 | Katulich | |

(Continued)

FOREIGN PATENT DOCUMENTS

DE    2409748    9/1975

(Continued)

*Primary Examiner* — Alessandro Amari

(74) *Attorney, Agent, or Firm* — Gardner, Linn, Burkhart & Flory, LLP

(57) ABSTRACT

An exterior sideview mirror assembly includes a single mirror backing plate element within a mirror housing. A main plano mirror element and an auxiliary non-plano curved mirror element are supported by the backing plate element. The backing plate element has a generally flat portion for supporting the main plano mirror element and a curved portion for supporting the auxiliary non-plano curved mirror element. The curved portion may be angled relative to the generally flat portion in a manner such that, when a driver of the vehicle aligns the rearward field of view of the main plano mirror element, the rearward field of view of the main plano mirror element may be aligned downwardly relative to the vehicle body side. The main plano mirror element includes a generally flat reflector-coated glass substrate or a generally flat polymeric substrate having a thin glass element applied to a surface thereof.

37 Claims, 16 Drawing Sheets

U.S. PATENT DOCUMENTS

| | | |
|---|---|---|
| 3,175,463 A | 3/1965 | Seashore |
| 3,266,016 A | 8/1966 | Maruyama et al. |
| 3,267,806 A | 8/1966 | Azegami |
| 3,280,701 A | 10/1966 | Donnelly et al. |
| 3,337,285 A | 8/1967 | Travis |
| 3,338,655 A | 8/1967 | Young |
| 3,375,053 A | 3/1968 | Ward |
| 3,389,952 A | 6/1968 | Tobin, Jr. |
| 3,404,935 A | 10/1968 | Creager |
| 3,408,136 A | 10/1968 | Travis |
| 3,424,517 A | 1/1969 | Budreck |
| 3,563,638 A | 2/1971 | Panozzo |
| 3,601,614 A | 8/1971 | Platzer, Jr. |
| 3,610,739 A | 10/1971 | Seashore |
| 3,667,833 A | 6/1972 | Baldwin, Sr. |
| 3,708,222 A | 1/1973 | Stern |
| 3,759,647 A | 9/1973 | Schrenk et al. |
| 3,764,201 A | 10/1973 | Haile |
| 3,773,882 A | 11/1973 | Schrenk |
| 3,806,232 A | 4/1974 | Gray |
| 3,826,563 A | 7/1974 | Davis |
| 3,881,811 A | 5/1975 | French |
| 3,884,606 A | 5/1975 | Schrenk |
| 3,909,117 A | 9/1975 | Takahashi et al. |
| 4,193,668 A | 3/1980 | Skinner |
| 4,200,359 A | 4/1980 | Lawson |
| 4,223,983 A | 9/1980 | Bloom |
| 4,258,979 A | 3/1981 | Mahin |
| 4,264,144 A | 4/1981 | McCord |
| 4,268,120 A | 5/1981 | Jitsumori |
| 4,281,899 A | 8/1981 | Oskam |
| 4,293,191 A | 10/1981 | Kim |
| 4,303,308 A | 12/1981 | Kobrin |
| 4,306,770 A | 12/1981 | Marhauer |
| 4,311,362 A | 1/1982 | LaPorte |
| 4,311,363 A | 1/1982 | Marsalka et al. |
| 4,325,609 A | 4/1982 | Alford |
| 4,331,382 A | 5/1982 | Graff |
| 4,350,412 A | 9/1982 | Steenblik et al. |
| 4,385,804 A | 5/1983 | Tamura et al. |
| 4,435,042 A | 3/1984 | Wood et al. |
| 4,436,371 A | 3/1984 | Wood et al. |
| 4,436,372 A | 3/1984 | Schmidt et al. |
| 4,439,013 A | 3/1984 | Hagn et al. |
| 4,449,786 A | 5/1984 | McCord |
| 4,470,665 A | 9/1984 | Blom |
| 4,499,451 A | 2/1985 | Suzuki et al. |
| 4,526,446 A | 7/1985 | Adams |
| 4,549,786 A | 10/1985 | Albers et al. |
| 4,555,166 A | 11/1985 | Enomoto |
| 4,575,202 A | 3/1986 | McGuire |
| 4,588,267 A | 5/1986 | Pastore |
| 4,609,266 A | 9/1986 | Blom |
| 4,623,222 A | 11/1986 | Itoh et al. |
| 4,629,296 A | 12/1986 | White |
| 4,630,904 A | 12/1986 | Pastore |
| 4,666,264 A | 5/1987 | Yamabe |
| 4,674,849 A | 6/1987 | Stewart |
| 4,674,850 A | 6/1987 | Blom |
| 4,678,294 A | 7/1987 | Van Nostrand |
| 4,679,906 A | 7/1987 | Brandenburg |
| 4,712,879 A | 12/1987 | Lynam et al. |
| 4,715,701 A | 12/1987 | Urban |
| 4,721,364 A | 1/1988 | Itoh et al. |
| 4,727,302 A | 2/1988 | Mizuta et al. |
| 4,733,336 A | 3/1988 | Skogler et al. |
| 4,737,188 A | 4/1988 | Bahls |
| 4,770,522 A | 9/1988 | Alten |
| 4,773,740 A | 9/1988 | Kawakami et al. |
| D297,926 S | 10/1988 | Kesler |
| 4,793,690 A | 12/1988 | Gahan et al. |
| 4,799,768 A | 1/1989 | Gahan |
| 4,824,231 A | 4/1989 | Quintana |
| 4,826,289 A | 5/1989 | Vandenbrink et al. |
| 4,828,379 A | 5/1989 | Parsons et al. |
| 4,853,283 A | 8/1989 | Skolnick |
| 4,859,046 A | 8/1989 | Traynor et al. |
| 4,882,466 A | 11/1989 | Friel |
| 4,882,565 A | 11/1989 | Gallmeyer |
| 4,906,075 A | 3/1990 | Majsumiya |
| 4,906,085 A | 3/1990 | Sugihara et al. |
| 4,913,542 A | 4/1990 | Adolfsson |
| 4,917,485 A | 4/1990 | Baldwin, Sr. |
| 4,929,074 A | 5/1990 | Urban |
| 4,932,769 A | 6/1990 | Goosen |
| 4,932,770 A | 6/1990 | Caravaty |
| 4,944,581 A | 7/1990 | Ichikawa |
| 4,948,242 A | 8/1990 | Desmond et al. |
| 4,989,964 A | 2/1991 | Meise |
| 5,005,962 A | 4/1991 | Edelman |
| 5,014,167 A | 5/1991 | Roberts |
| 5,022,747 A | 6/1991 | Polanyi et al. |
| 5,033,835 A | 7/1991 | Platzer, Jr. |
| 5,044,739 A | 9/1991 | do Espirito Santo |
| 5,050,977 A | 9/1991 | Platzer, Jr. |
| 5,052,792 A | 10/1991 | McDonough |
| 5,066,112 A | 11/1991 | Lynam et al. |
| 5,073,012 A | 12/1991 | Lynam |
| 5,076,673 A | 12/1991 | Lynam et al. |
| 5,078,480 A | 1/1992 | Warszawski |
| 5,080,492 A | 1/1992 | Platzer, Jr. |
| 5,085,907 A | 2/1992 | Smith |
| 5,107,374 A | 4/1992 | Lupo et al. |
| 5,115,346 A | 5/1992 | Lynam |
| 5,115,352 A | 5/1992 | do Espirito Santo |
| 5,117,346 A | 5/1992 | Gard |
| 5,118,540 A | 6/1992 | Hutchison |
| 5,140,455 A | 8/1992 | Varaprasad et al. |
| 5,142,407 A | 8/1992 | Varaprasad et al. |
| 5,151,816 A | 9/1992 | Varaprasad et al. |
| 5,151,824 A | 9/1992 | O'Farrell |
| 5,166,833 A | 11/1992 | Shyu |
| 5,178,448 A | 1/1993 | Adams et al. |
| 5,179,471 A | 1/1993 | Caskey et al. |
| 5,183,099 A | 2/1993 | Bechu |
| 5,189,537 A | 2/1993 | O'Farrell |
| 5,193,029 A | 3/1993 | Schofield et al. |
| 5,207,492 A | 5/1993 | Roberts |
| 5,225,943 A | 7/1993 | Lupo |
| 5,233,461 A | 8/1993 | Dornan et al. |
| 5,237,458 A | 8/1993 | Polanyi et al. |
| 5,237,459 A | 8/1993 | Strauss |
| 5,239,405 A | 8/1993 | Varaprasad et al. |
| 5,247,395 A | 9/1993 | Martinez |
| 5,253,109 A | 10/1993 | O'Farrell et al. |
| 5,262,894 A | 11/1993 | Wheatley et al. |
| 5,285,060 A | 2/1994 | Larson et al. |
| 5,295,021 A | 3/1994 | Swanson |
| 5,296,973 A | 3/1994 | Burke |
| 5,313,335 A | 5/1994 | Gray et al. |
| 5,327,288 A | 7/1994 | Wellington et al. |
| 5,354,965 A | 10/1994 | Lee |
| 5,355,245 A | 10/1994 | Lynam |
| 5,361,172 A | 11/1994 | Schissel et al. |
| 5,371,659 A | 12/1994 | Pastrick et al. |
| 5,406,414 A | 4/1995 | O'Farrell et al. |
| 5,412,512 A | 5/1995 | Zebold et al. |
| 5,424,875 A | 6/1995 | Davis, II |
| 5,432,643 A | 7/1995 | Huang |
| 5,437,931 A | 8/1995 | Tsai et al. |
| 5,446,576 A | 8/1995 | Lynam et al. |
| 5,481,409 A | 1/1996 | Roberts |
| 5,483,386 A | 1/1996 | Carson |
| 5,497,305 A | 3/1996 | Pastrick et al. |
| 5,497,306 A | 3/1996 | Pastrick |
| 5,509,606 A | 4/1996 | Breithaupt et al. |
| 5,517,367 A | 5/1996 | Kim et al. |
| 5,523,877 A | 6/1996 | Lynam |
| 5,525,264 A | 6/1996 | Cronin et al. |
| 5,526,195 A | 6/1996 | Thomas |
| 5,530,588 A | 6/1996 | Vivier |
| 5,535,056 A | 7/1996 | Caskey et al. |
| 5,550,677 A | 8/1996 | Schofield et al. |
| 5,557,467 A | 9/1996 | McColgan et al. |
| 5,559,640 A | 9/1996 | Vachss et al. |
| 5,563,744 A | 10/1996 | Matsumiya |
| 5,567,360 A | 10/1996 | Varaprasad et al. |

| Patent No. | Kind | Date | Inventor |
|---|---|---|---|
| 5,575,552 | A | 11/1996 | Faloon et al. |
| 5,579,133 | A | 11/1996 | Black et al. |
| 5,587,236 | A | 12/1996 | Agrawal et al. |
| 5,587,699 | A | 12/1996 | Faloon et al. |
| 5,594,222 | A | 1/1997 | Caldwell |
| 5,594,593 | A | 1/1997 | Milner |
| 5,610,756 | A | 3/1997 | Lynam et al. |
| 5,621,569 | A | 4/1997 | Schlenke |
| 5,621,577 | A | 4/1997 | Lang et al. |
| 5,644,442 | A | 7/1997 | Lemere |
| 5,649,756 | A | 7/1997 | Adams et al. |
| 5,668,663 | A | 9/1997 | Varaprasad et al. |
| 5,669,698 | A | 9/1997 | Veldman et al. |
| 5,669,699 | A | 9/1997 | Pastrick et al. |
| 5,669,704 | A | 9/1997 | Pastrick |
| 5,669,705 | A | 9/1997 | Pastrick et al. |
| 5,670,935 | A | 9/1997 | Schofield et al. |
| 5,689,370 | A | 11/1997 | Tonar et al. |
| 5,691,855 | A | 11/1997 | Lupkas |
| 5,715,093 | A | 2/1998 | Schierbeek et al. |
| 5,722,836 | A | 3/1998 | Younker |
| 5,724,187 | A | 3/1998 | Varaprasad et al. |
| 5,751,489 | A | 5/1998 | Caskey et al. |
| 5,760,962 | A | 6/1998 | Schofield et al. |
| 5,784,211 | A | 7/1998 | Mingledorff |
| 5,786,772 | A | 7/1998 | Schofield et al. |
| 5,788,357 | A | 8/1998 | Muth et al. |
| 5,790,298 | A | 8/1998 | Tonar |
| 5,790,327 | A | 8/1998 | Lee et al. |
| 5,793,542 | A | 8/1998 | Kondo et al. |
| 5,796,094 | A | 8/1998 | Schofield et al. |
| 5,796,532 | A | 8/1998 | Kanazawa |
| 5,805,367 | A | 9/1998 | Kanazawa |
| 5,808,777 | A | 9/1998 | Lynam et al. |
| 5,823,654 | A | 10/1998 | Pastrick et al. |
| 5,825,527 | A | 10/1998 | Forgette et al. |
| 5,835,294 | A | 11/1998 | Minegishi |
| 5,838,505 | A | 11/1998 | Palathingal |
| 5,847,889 | A | 12/1998 | Komiyama et al. |
| 5,863,116 | A | 1/1999 | Pastrick et al. |
| 5,864,434 | A | 1/1999 | Taylor |
| 5,877,897 | A | 3/1999 | Schofield et al. |
| 5,910,854 | A | 6/1999 | Varaprasad et al. |
| 5,922,176 | A | 7/1999 | Caskey |
| 5,929,786 | A | 7/1999 | Schofield et al. |
| 5,938,320 | A | 8/1999 | Crandall |
| 5,980,050 | A | 11/1999 | McCord |
| 6,001,486 | A | 12/1999 | Varaprasad et al. |
| 6,002,511 | A | 12/1999 | Varaprasad et al. |
| 6,002,544 | A | 12/1999 | Yatsu |
| 6,005,724 | A | 12/1999 | Todd |
| 6,007,207 | A | 12/1999 | Liu |
| 6,030,084 | A | 2/2000 | Schmidt |
| 6,032,323 | A | 3/2000 | Smith et al. |
| 6,033,078 | A | 3/2000 | Su et al. |
| 6,065,840 | A | 5/2000 | Caskey et al. |
| 6,074,068 | A | 6/2000 | Palathingal |
| 6,097,023 | A | 8/2000 | Schofield et al. |
| 6,109,586 | A | 8/2000 | Hock |
| 6,111,684 | A | 8/2000 | Forgette et al. |
| 6,116,743 | A | 9/2000 | Hoek |
| 6,124,647 | A | 9/2000 | Marcus et al. |
| 6,128,860 | A | 10/2000 | Repp et al. |
| 6,154,306 | A | 11/2000 | Varaprasad et al. |
| 6,164,564 | A | 12/2000 | Franco et al. |
| 6,172,613 | B1 | 1/2001 | DeLine et al. |
| 6,176,602 | B1 | 1/2001 | Pastrick et al. |
| 6,178,034 | B1 | 1/2001 | Allemand et al. |
| 6,196,688 | B1 | 3/2001 | Caskey et al. |
| 6,198,409 | B1 | 3/2001 | Schofield et al. |
| 6,199,993 | B1 | 3/2001 | Mou |
| 6,201,642 | B1 | 3/2001 | Bos |
| 6,207,083 | B1 | 3/2001 | Varaprasad et al. |
| 6,227,689 | B1 | 5/2001 | Miller |
| 6,245,262 | B1 | 6/2001 | Varaprasad et al. |
| 6,250,148 | B1 | 6/2001 | Lynam |
| 6,257,746 | B1 | 7/2001 | Todd et al. |
| 6,260,608 | B1 | 7/2001 | Kim |
| 6,270,225 | B1 | 8/2001 | Goolsby |
| 6,276,821 | B1 | 8/2001 | Pastrick et al. |
| 6,286,965 | B1 | 9/2001 | Caskey et al. |
| 6,294,989 | B1 | 9/2001 | Schofield et al. |
| 6,310,611 | B1 | 10/2001 | Caldwell |
| 6,315,419 | B1 | 11/2001 | Platzer, Jr. |
| 6,318,870 | B1 | 11/2001 | Spooner et al. |
| 6,320,282 | B1 | 11/2001 | Caldwell |
| 6,329,925 | B1 | 12/2001 | Skiver et al. |
| 6,341,523 | B2 | 1/2002 | Lynam |
| 6,343,402 | B1 | 2/2002 | Smith et al. |
| 6,356,376 | B1 | 3/2002 | Tonar et al. |
| 6,390,632 | B1 | 5/2002 | Palathingal |
| 6,396,397 | B1 | 5/2002 | Bos et al. |
| 6,398,377 | B1 | 6/2002 | Chou |
| 6,409,354 | B1 | 6/2002 | Richard |
| 6,420,036 | B1 | 7/2002 | Varaprasad et al. |
| 6,428,172 | B1 | 8/2002 | Hutzel et al. |
| 6,441,964 | B1 | 8/2002 | Chu et al. |
| 6,445,287 | B1 | 9/2002 | Schofield et al. |
| 6,449,082 | B1 | 9/2002 | Agrawal et al. |
| 6,472,979 | B2 | 10/2002 | Schofield et al. |
| 6,498,620 | B2 | 12/2002 | Schofield et al. |
| 6,501,387 | B2 | 12/2002 | Skiver et al. |
| 6,511,192 | B1 | 1/2003 | Henion et al. |
| 6,512,624 | B2 | 1/2003 | Tonar et al. |
| 6,522,451 | B1 | 2/2003 | Lynam |
| 6,537,138 | B2 | 3/2003 | Ohmori et al. |
| 6,582,109 | B2 | 6/2003 | Miller |
| 6,595,649 | B2 | 7/2003 | Hoekstra et al. |
| 6,615,438 | B1 | 9/2003 | Franco |
| 6,627,918 | B2 | 9/2003 | Getz et al. |
| 6,642,851 | B2 | 11/2003 | DeLine et al. |
| 6,648,477 | B2 | 11/2003 | Hutzel et al. |
| 6,669,109 | B2 | 12/2003 | Ivanov et al. |
| 6,690,268 | B2 | 2/2004 | Schofield et al. |
| 6,709,119 | B2 | 3/2004 | Gillich et al. |
| 6,717,610 | B1 | 4/2004 | Bos et al. |
| 6,717,712 | B2 | 4/2004 | Lynam et al. |
| 6,719,215 | B2 | 4/2004 | Drouillard |
| 6,731,205 | B2 | 5/2004 | Schofield et al. |
| 6,737,629 | B2 | 5/2004 | Nixon et al. |
| 6,742,904 | B2 | 6/2004 | Bechtel et al. |
| 6,757,109 | B2 | 6/2004 | Bos |
| D493,131 | S | 7/2004 | Lawlor et al. |
| D493,394 | S | 7/2004 | Lawlor et al. |
| 6,824,281 | B2 | 11/2004 | Schofield et al. |
| 6,831,268 | B2 | 12/2004 | Bechtel et al. |
| 6,882,287 | B2 | 4/2005 | Schofield |
| 6,919,796 | B2 | 7/2005 | Boddy et al. |
| 6,932,483 | B2 | 8/2005 | Strumolo et al. |
| 6,979,090 | B1 | 12/2005 | Wnuk |
| 7,005,974 | B2 | 2/2006 | McMahon et al. |
| 7,038,577 | B2 | 5/2006 | Pawlicki et al. |
| 7,097,312 | B2 | 8/2006 | Platzer, Jr. |
| 7,106,392 | B2 | 9/2006 | You |
| 7,126,456 | B2 | 10/2006 | Boddy et al. |
| 7,167,294 | B2 | 1/2007 | Lynam et al. |
| 7,168,830 | B2 | 1/2007 | Pastrick et al. |
| 7,184,190 | B2 | 2/2007 | McCabe et al. |
| 7,195,381 | B2 | 3/2007 | Lynam et al. |
| 7,249,860 | B2 | 7/2007 | Kulas et al. |
| 7,255,451 | B2 | 8/2007 | McCabe et al. |
| 7,267,448 | B2 | 9/2007 | Schmidt et al. |
| 7,274,501 | B2 | 9/2007 | McCabe et al. |
| 7,289,037 | B2 | 10/2007 | Uken et al. |
| 7,338,177 | B2 | 3/2008 | Lynam |
| 7,339,149 | B1 | 3/2008 | Schofield et al. |
| 7,345,680 | B2 | 3/2008 | David |
| 7,370,983 | B2 | 5/2008 | DeWind et al. |
| 7,377,675 | B2 | 5/2008 | Pastrick et al. |
| 7,391,563 | B2 | 6/2008 | McCabe et al. |
| 7,400,435 | B2 | 7/2008 | Byers et al. |
| 7,420,756 | B2 | 9/2008 | Lynam |
| 7,423,522 | B2 | 9/2008 | O'Brien et al. |
| 7,492,281 | B2 | 2/2009 | Lynam et al. |
| 7,526,103 | B2 | 4/2009 | Schofield et al. |
| 7,581,859 | B2 | 9/2009 | Lynam |
| 7,626,749 | B2 | 12/2009 | Baur et al. |
| 7,636,188 | B2 | 12/2009 | Baur et al. |

| | | | | | |
|---|---|---|---|---|---|
| 7,934,843 B2 * | 5/2011 | Lynam .................. 359/866 | | FOREIGN PATENT DOCUMENTS | |
| 2002/0036828 A1 | 3/2002 | Wong | | | |
| 2002/0072026 A1 * | 6/2002 | Lynam et al. ............. 432/77 | DE | 2550095 | 5/1976 |
| 2002/0105741 A1 | 8/2002 | Platzer, Jr. | DE | 2647592 | 4/1978 |
| 2002/0159169 A1 | 10/2002 | McCord | DE | 2915521 | 10/1980 |
| 2002/0159270 A1 | 10/2002 | Lynam et al. | DE | 3302735 | 8/1984 |
| 2003/0043589 A1 | 3/2003 | Blank | DE | 3329998 | 3/1985 |
| 2003/0117731 A1 | 6/2003 | Platzer, Jr. | DE | 3620228 | 12/1987 |
| 2004/0032638 A1 | 2/2004 | Tonar et al. | DE | 4026578 | 4/1992 |
| 2004/0032675 A1 | 2/2004 | Weller et al. | EP | 0210757 | 2/1987 |
| 2004/0032676 A1 | 2/2004 | Drummond et al. | EP | 0310261 | 4/1989 |
| 2004/0165291 A1 | 8/2004 | Platzer, Jr. | EP | 0356099 | 2/1990 |
| 2004/0264011 A1 | 12/2004 | Lynam | EP | 0551802 | 1/1992 |
| 2005/0078389 A1 | 4/2005 | Kulas et al. | EP | 0728618 | 8/1996 |
| 2005/0083577 A1 | 4/2005 | Varaprasad et al. | EP | 0729864 | 9/1996 |
| 2005/0099693 A1 | 5/2005 | Schofield et al. | EP | 0791503 | 8/1997 |
| 2005/0134983 A1 | 6/2005 | Lynam | EP | 0917987 | 5/1999 |
| 2005/0232469 A1 | 10/2005 | Schofield et al. | FR | 2628042 | 3/1988 |
| 2005/0248859 A1 | 11/2005 | Platzer, Jr. | GB | 1279158 | 6/1972 |
| 2006/0050018 A1 | 3/2006 | Hutzel et al. | GB | 2048189 | 12/1980 |
| 2006/0061008 A1 | 3/2006 | Karner et al. | GB | 2092534 | 8/1982 |
| 2006/0125919 A1 | 6/2006 | Camilleri et al. | JP | 0051637 | 4/1980 |
| 2006/0126150 A1 | 6/2006 | Tonar et al. | JP | 55076721 | 10/1980 |
| 2006/0171704 A1 | 8/2006 | Bingle et al. | JP | 362075619 | 4/1987 |
| 2006/0184297 A1 | 8/2006 | Higgins-Luthman | JP | 62105103 | 5/1987 |
| 2006/0268440 A1 | 11/2006 | Platzer, Jr. | JP | 1186443 | 7/1989 |
| 2007/0058257 A1 | 3/2007 | Lynam | JP | 1208245 | 8/1989 |
| 2007/0285789 A1 | 12/2007 | Lindahl et al. | KR | 2002092059 | 12/2002 |
| 2008/0212189 A1 | 9/2008 | Baur et al. | NL | 7908257 | 6/1981 |
| 2008/0225421 A1 | 9/2008 | Platzer | WO | WO 0181956 | 11/2001 |
| 2008/0304170 A1 | 12/2008 | Zhao | WO | WO 2004026633 | 4/2004 |
| 2008/0308219 A1 | 12/2008 | Lynam | WO | WO 2004047421 | 6/2004 |
| 2009/0040306 A1 | 2/2009 | Foote et al. | WO | WO 2004103772 | 12/2004 |
| 2009/0115631 A1 | 5/2009 | Foote et al. | WO | WO 2006124682 | 11/2006 |
| 2009/0237820 A1 | 9/2009 | McCabe et al. | WO | WO 2007005942 | 1/2007 |
| | | | WO | WO 2008051910 | 5/2008 |

* cited by examiner

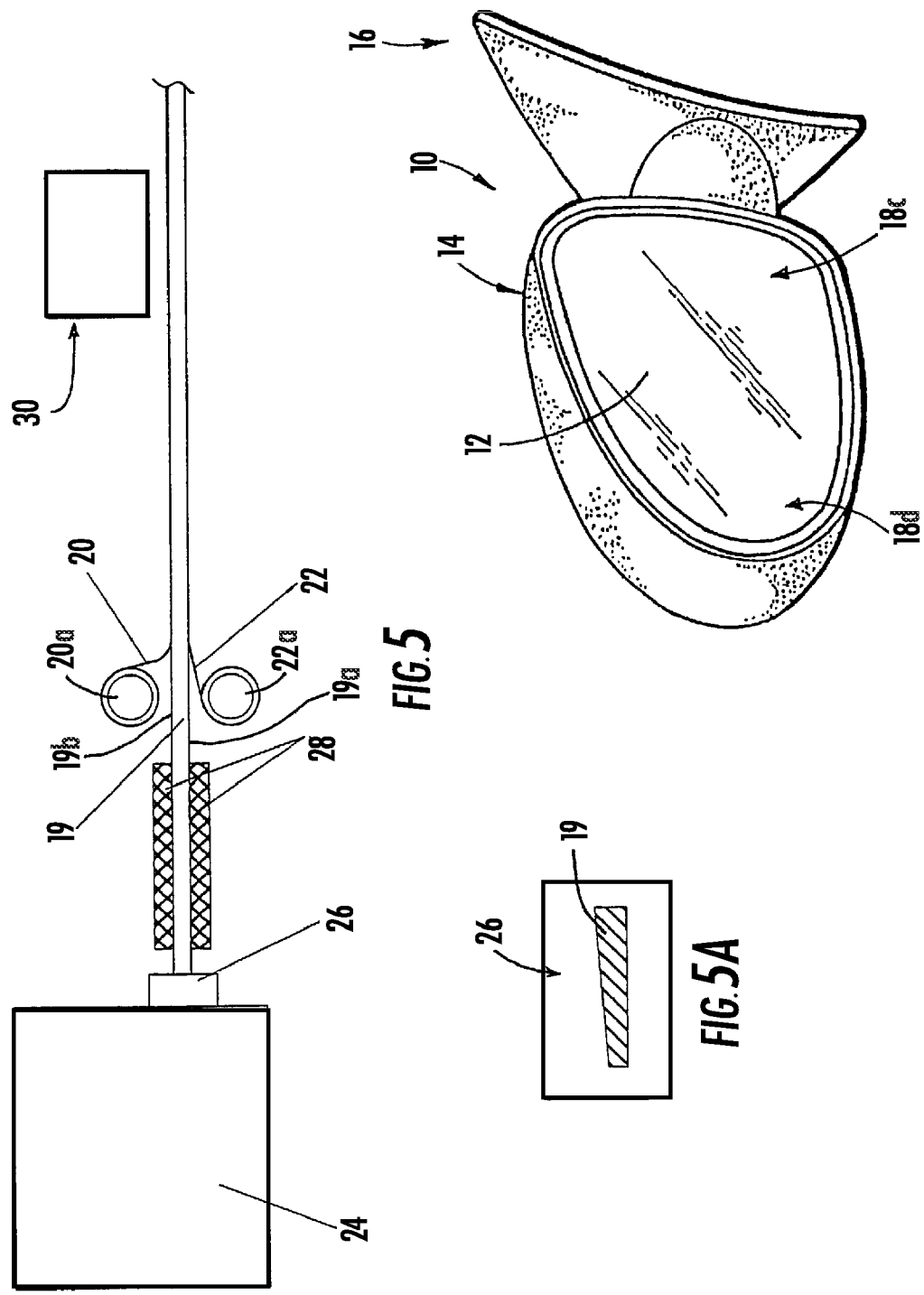

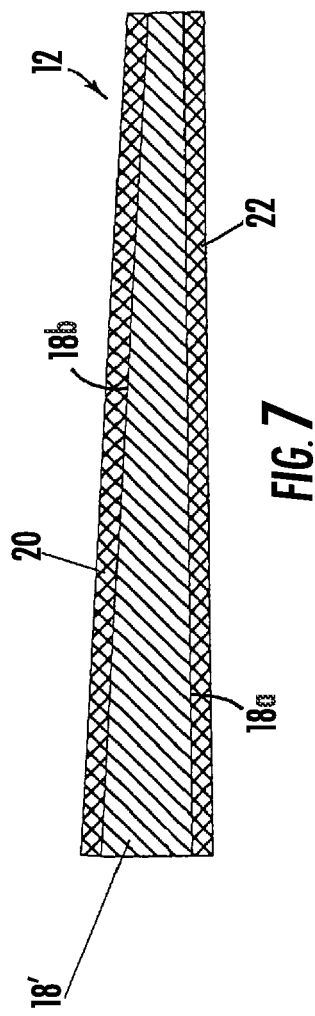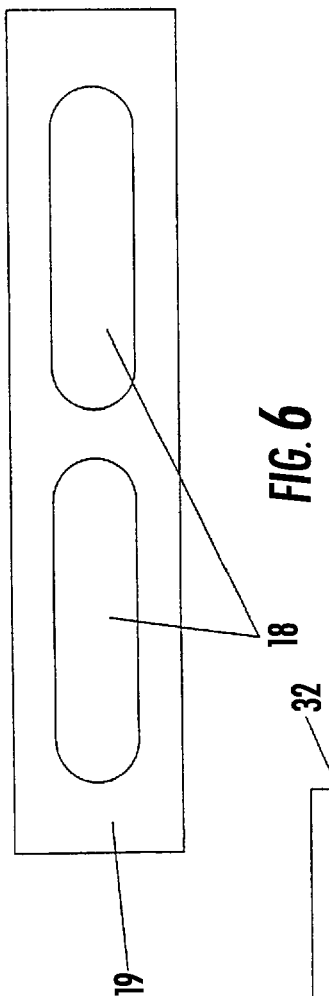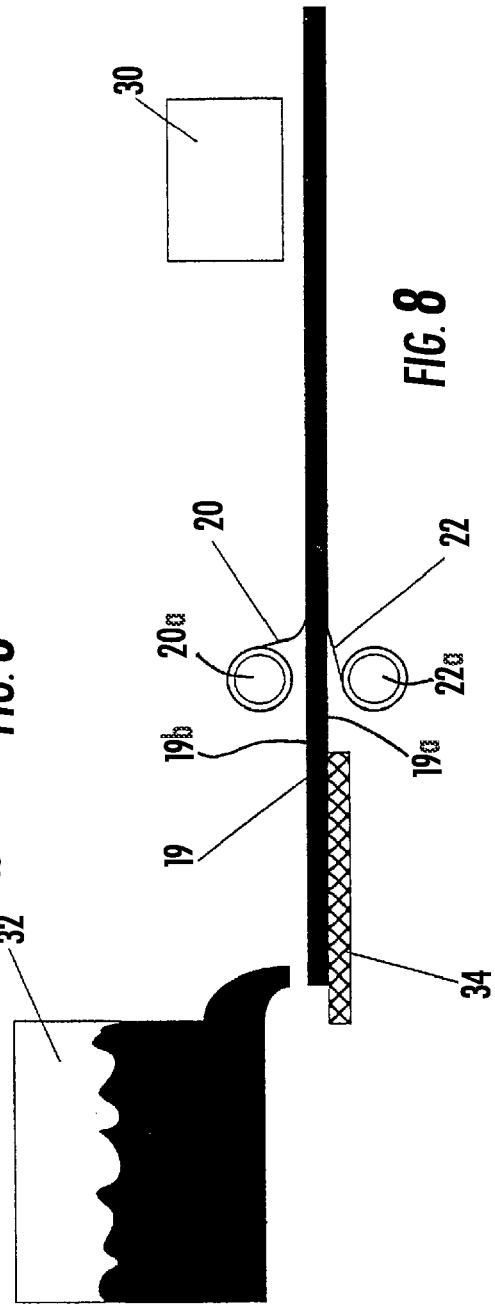

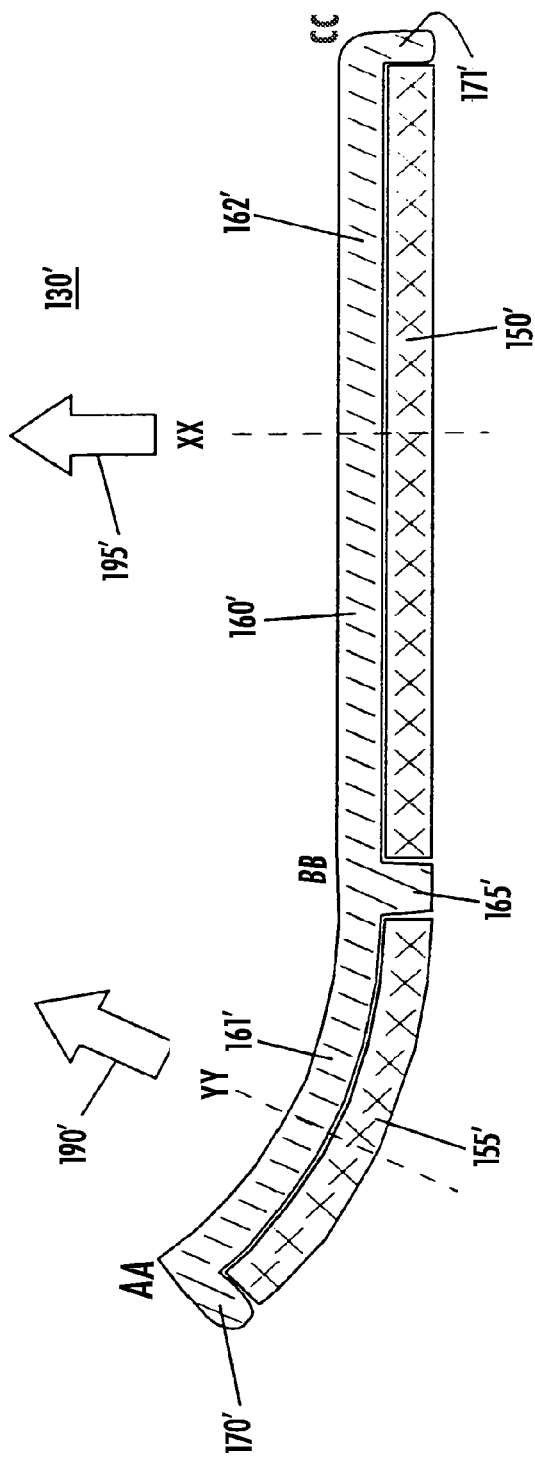
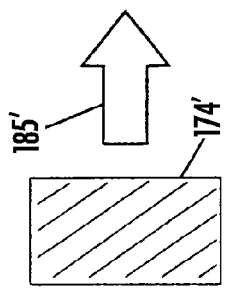
FIG. 14
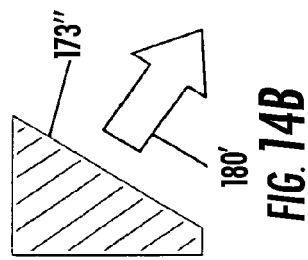
FIG. 14B
FIG. 14A

EXTERIOR SIDEVIEW MIRROR SYSTEM

CROSS REFERENCE TO RELATED APPLICATIONS

The present application is a continuation of U.S. patent application Ser. No. 12/851,045, filed Aug. 5, 2010, now U.S. Pat. No. 7,934,843, which is a continuation of U.S. patent application Ser. No. 12/197,666, filed Aug. 25, 2008, now U.S. Pat. No. 7,842,154, which is a division of U.S. patent application Ser. No. 10/709,434, filed May 5, 2004, now U.S. Pat. No. 7,420,756, which claims the benefit of U.S. provisional application Ser. No. 60/471,872, filed May 20, 2003, which are hereby incorporated herein by reference in their entireties.

FIELD OF THE INVENTION

The present invention relates generally to rearview mirror elements for a rearview mirror assembly of a vehicle and, more particularly, to exterior rearview mirror elements comprising multi-radius reflective elements.

BACKGROUND OF THE INVENTION

Typically, mirror reflective elements are formed of glass and have a reflective coating deposited thereon, such as via vacuum deposition or wet chemical silvering or the like, such as on a silver line, such as described in U.S. Pat. No. 4,737,188, which is hereby incorporated herein by reference. Polymeric reflective elements are also known, such as are described in U.S. Pat. Nos. 6,601,960; 6,409,354; 4,944,581; 4,385,804; 4,193,668; 4,666,264; and 5,483,386, which are hereby incorporated herein by reference. For such polymeric mirror reflective elements, the need exists for a hard coat or surface on the first or outer or exterior surface of the element which is contacted by the exterior elements, such as rain, road debris, or the like, or contacted, for example, by a person scraping ice or wiping snow or condensation off the mirror element outer surface, such as during winter. A variety of hard coats have been proposed in the art, typically applied by dip coating or vacuum deposition techniques. However, a need exists for an automotive mirror reflective element which has the properties of plastic (i.e., a specific gravity roughly half that of glass), and which has a glass-like exterior surface.

Also, exterior rearview mirror reflective elements may be aspheric or multi-radius, and may typically have a less curved or substantially flat (around 2000 mm radius or thereabouts) inboard portion or surface at the inboard side of the reflective element (i.e., closer to the side body of the vehicle when the mirror assembly is mounted to the vehicle), and a more curved multi-radius portion or surface at the outboard side of the reflective element (i.e., further from the side body of the vehicle when the mirror assembly is mounted to the vehicle), in order to provide an extended field of view. It is typically desirable to have the reflective elements or substrates of such exterior mirror elements to be formed of a glass material because glass material typically provides an enhanced scratch resistance over conventional optical resins and the like.

Therefore, there is a need in the art for a mirror reflective element that overcomes the shortcomings of the prior art elements and substrates.

SUMMARY OF THE INVENTION

The present invention provides a molded wide angle or multi-radius substrate for a reflective element. The molded substrate comprises a polymeric optical resin transparent material and has a curved exterior surface, which may have a less curved/flatter or substantially flat inboard portion or surface and a more curved outboard portion or surface. The molded substrate may have an anti-abrasion film or layer, such as an ultrathin glass film, applied over the exterior surface or first surface to provide substantial protection against scratches occurring to the molded substrate. The inner surface or second surface of the reflective element substrate may have a reflective coating or layer, such as a polymeric reflective film, laminated or adhered or otherwise applied thereto.

According to an aspect of the present invention, a wide angle reflective element for a mirror assembly for a vehicle includes a wide angle substrate having an exterior surface and a glass film disposed at the exterior surface. The exterior surface of the substrate has a less curved inboard portion or surface and a more curved outboard portion or surface. The substrate comprises a polymeric resin material. The glass film is adapted to substantially conform to the exterior surface of the wide angle substrate. The glass film comprises a glass material and has a thickness of less than approximately 0.8 mm.

According to another aspect of the present invention, a reflective element for a mirror assembly for a vehicle comprises a substrate having an exterior surface, and an anti-abrasion film applied to the exterior surface. The substrate comprises a polymeric resin material, such as a transparent optical polymeric resin material. The anti-abrasion film preferably comprises a glass material (such as a soda lime glass or a borosilicate or the like) and has a thickness of less than approximately 0.8 mm, and is flexible to conform to the exterior surface.

The substrate may be cut from a strip or sheet of molded or extruded or cast substrate material (or less preferably, may be cut from an injected molded strip or sheet). The flexible glass film may be unrolled from a reel or roll and applied to the exterior surface of the elongated strip or sheet of substrate material. The substrate, including the glass film or layer, may then be cut or otherwise formed from the elongated strip or sheet.

The substrate may comprise a wide angle substrate and/or may comprise a multi-radius exterior surface having a less curved inboard portion or surface and a more curved outboard portion or surface.

A reflective film or layer may be applied to the inner surface or side of the substrate or strip opposite the exterior surface. The reflective film may comprise a polymeric reflective film laminated or otherwise adhered or applied to the inner side of the substrate or strip. The reflective film may comprise an all polymer-thin-film multilayer, high reflective mirror film comprising multiple coextrusion of many plastic layers to form a highly reflective mirror film.

Optionally, a reflective film or layer may be applied to the exterior surface of the substrate or sheet or strip, and the glass film or layer or sheet may be applied over the reflective film layer. In such an application, the substrate acts as a support or backing plate for the reflective film or layer and the glass film or layer, whereby optical clarity/transparency of the substrate material is not necessary.

According to another aspect of the present invention, a method for forming a reflective element substrate for a mirror assembly of a vehicle comprises generally continuously forming an elongated strip or sheet of substrate material and applying a substantially transparent functional film, such as an anti-abrasion film or a hydrophilic film or a hydrophobic film or the like, to a surface of the elongated strip sheet. The substrate material may comprise a transparent optical polymeric resin. The functional film is preferably unrolled from a reel or roll of film and applied to the surface of the elongated strip or sheet generally continuously as the strip or sheet is formed or extruded or cast or molded. Preferably, multiple mirror element shapes or mirror element substrates may be cut or otherwise formed from the elongated sheet after the functional film is applied to the surface of the strip or sheet.

The functional or anti-abrasion film may comprise an ultrathin glass material which is sufficiently flexible to be provided in a reel or roll (or in a sheet that is flexible and conformable to a bent substrate). The substrates may be formed with a wide angle exterior surface or a multi-radius exterior surface. The anti-abrasion film may be sufficiently flexible to conform to the wide angle or multi-radius or curved exterior surface.

A reflective film, such as a polymeric reflective film or the like, may be applied to the opposite surface of the substrate or sheet or strip. The reflective film may be sufficiently flexible to be provided in a reel or roll form (or in a sheet that is flexible and conformable to a bent substrate) for unrolling the reflective film as the film is generally continuously applied to the surface of the generally continuously formed sheet or strip.

Therefore, the present invention provides a molded wide angle or multi-radius single substrate for a rearview mirror assembly which has an anti-abrasion or anti-scratch film or layer applied to the curved, wide angle or multi-radius exterior surface of the substrate. The anti-abrasion film preferably comprises an ultrathin glass film or sheet to provide enhanced scratch resistance. The molded substrate may have a reflective film or layer laminated or applied to the inner surface opposite the exterior surface.

These and other objects, advantages, purposes and features of the present invention will become apparent upon review of the following specification in conjunction with the drawings.

BRIEF DESCRIPTION OF THE DRAWINGS

FIG. 1 is a perspective view of an exterior rearview mirror assembly in accordance with the present invention;

FIG. 5 is a diagram showing the extruding, coating and cutting processes for manufacturing a prismatic mirror reflective element in accordance with the present invention;

FIG. 5A is an elevation of the extruder of FIG. 5, showing the wedge shape of the extruded strip and reflective element substrate;

FIG. 6 is a plan view of the extruded strip showing the cut out shapes of the reflective element cut from the extruded strip;

FIG. 7 is a sectional view of the reflective element formed by the process shown in FIG. 5;

FIG. 8 is a diagram showing an alternate process for manufacturing a prismatic mirror reflective element in accordance with the present invention, where a strip of substrate material is cast and formed via a caster and float section;

FIG. 14 is a sectional view of a second embodiment of a plano reflective element assembly according to the present invention including a demarcation element formed as a dividing wall in a backing plate element;

FIG. 14A is a cross-section taken along line XX of FIG. 14;

FIG. 14B is a cross-sectional view taken along line YY of FIG. 14;

DESCRIPTION OF THE PREFERRED EMBODIMENTS

Figure 3:
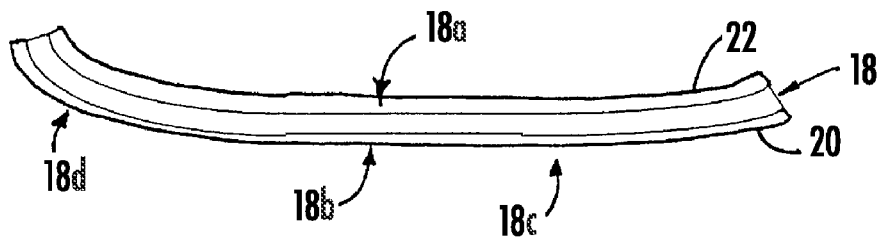
FIG. 3 is a sectional view of the wide angle or multi-radius reflective element taken along the line III-III in FIG. 2.
Figure 2:
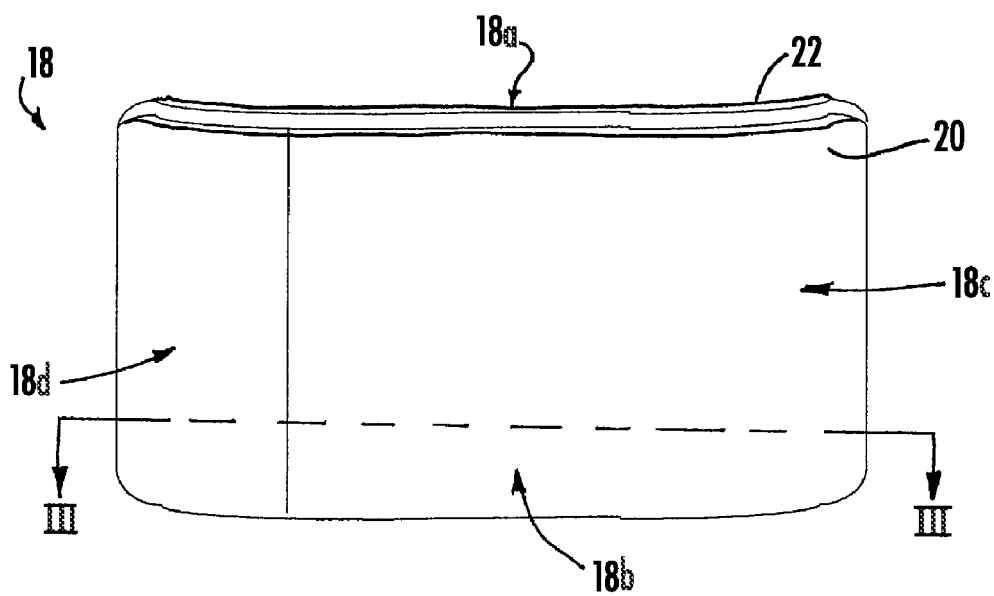
FIG. 2 is a perspective view of a wide angle or multi-radius reflective element in accordance with the present invention.

Referring now to the drawings and the illustrative embodiments depicted therein, an exterior rearview mirror assembly 10 includes a reflective element 12 mounted at a casing 14, which is mounted at an exterior portion of a vehicle 16 (FIG. 1). Reflective element 12 may provide an enhanced field of view or wide angle field of view to a driver or occupant of the vehicle and may comprise a single reflective element substrate 18 having an inner surface 18a and an opposite exterior surface 18b (FIGS. 2 and 3). The exterior surface 18b comprises a less curved or substantially flat inboard portion or surface 18c and a more curved outboard portion or surface 18d, as discussed below. The substrate 18 may have an anti-abrasion coating or layer or film 20, such as an ultrathin glass coating or layer or film, laminated or deposited or otherwise applied to the exterior surface 18b, and may have a reflective coating or layer 22 laminated or applied to the inner surface 18a, as also discussed below. Aspects of the reflective element of the present invention may be suitable for use in a reflective element for an exterior rearview mirror assembly (as shown in FIG. 1) and/or a reflective element for an interior rearview mirror assembly (not shown).

Reflective element 12 may comprise an aspheric or multiradius or wide angle single element reflective element substrate. The reflective element 12 may provide a field of view similar to the plano-auxiliary reflective element assembly disclosed in U.S. Pat. Nos. 6,522,451 and 6,717,712, which are hereby incorporated herein by reference.

Figure 9:
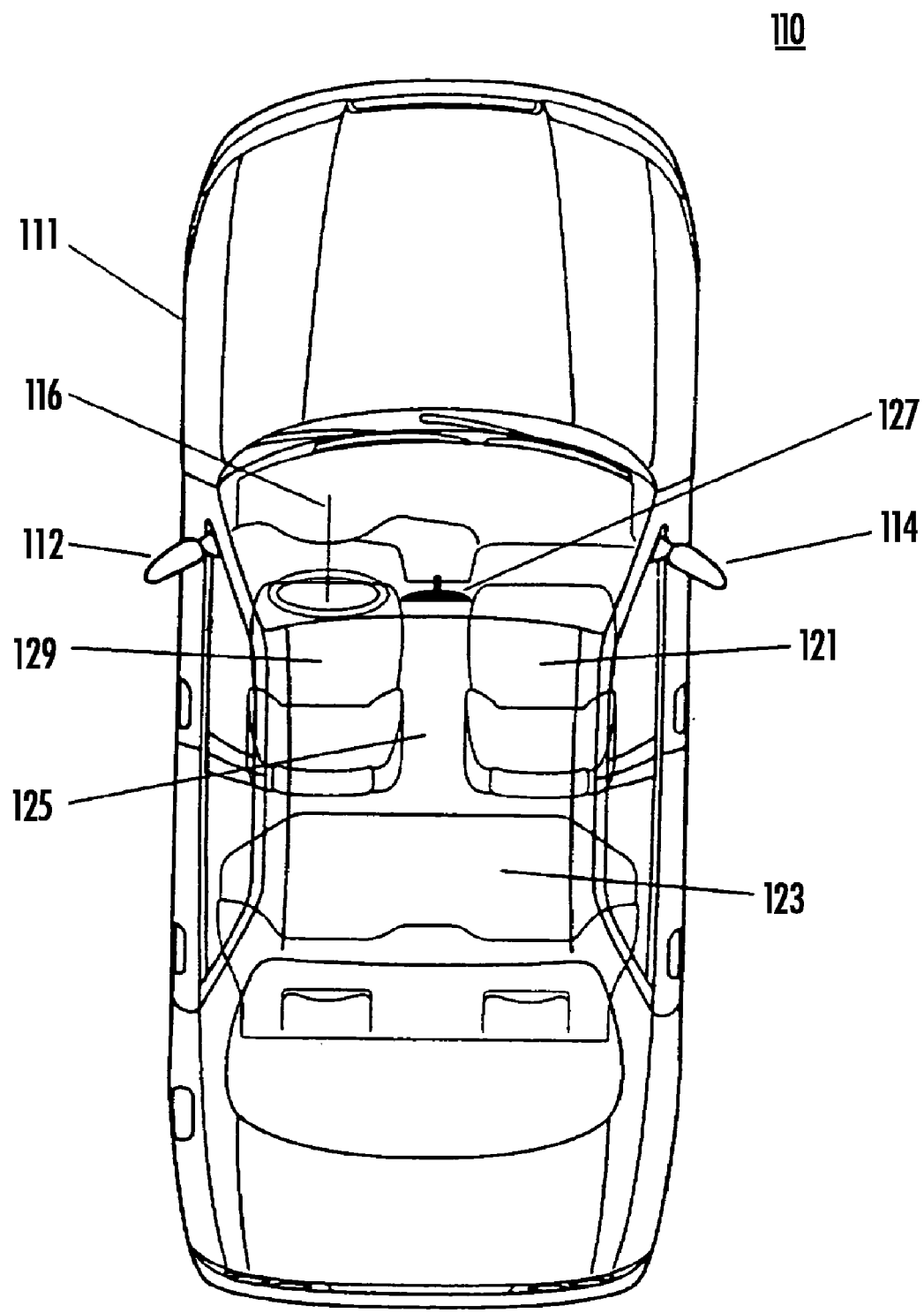
FIG. 9 is a perspective view of an automobile equipped with exterior sideview mirror assemblies according to this present invention.
Figure 10:
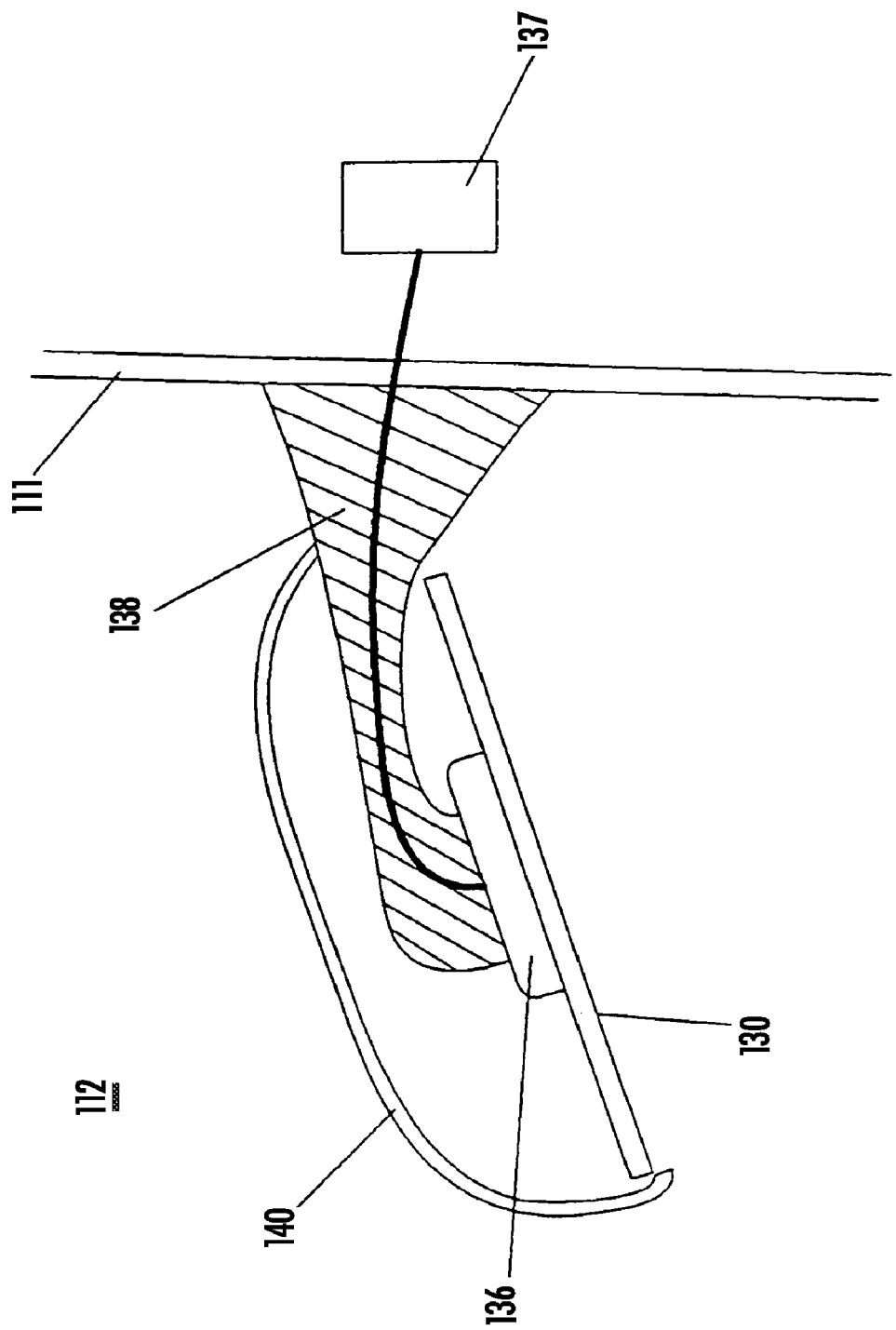
FIG. 10 is a top plan partial fragmentary view of the driver's side exterior rearview mirror assembly of FIG. 9.

As illustrated in FIG. 9 from U.S. Pat. No. 6,717,712, incorporated above, passenger automobile 110 (which may be a sedan, a station-wagon, a sports car, a convertible, a minivan, a sports utility vehicle, a pick-up truck or a similar passenger carrying non-commercial, personal transportation automobile) includes an interior rearview mirror assembly 127 positioned within interior vehicle cabin 125. Interior vehicle cabin 125 further includes a steering wheel 116, a driver seat 129 positioned at steering wheel 116, a front passenger seat 121 adjacent to driver seat 129 in the front portion of cabin 125, and a rear passenger seat 123 in the rear portion of cabin 125. Automobile 110 further includes a driver-side exterior sideview mirror assembly 112 and a passenger-side exterior sideview mirror assembly 114, each adapted for attachment to opposing sides of automobile body 111, most preferably adjacent to the seating position of the driver seated in driver seat 129 for driver-side assembly 112 and adjacent to the front passenger seat 121 for passenger-side assembly 114. Exterior sideview mirrors, mounted as shown in FIG. 9 close to the driver seating location, are commonly referred to as door-mounted exterior sideview mirror assemblies. Driver-side exterior sideview mirror assembly 112 includes, as illustrated in FIG. 10, a plano-multiradius exterior sideview reflective element assembly 130. Plano-multiradius reflective element assembly 130 is mounted to a reflective element positioning actuator 136. The orientation of plano-multiradius reflective element assembly 130, and hence its rearward field of view, is adjustable by actuator 136 in response to control 137. Control 137 can comprise a handset control that allows the driver manually move the orientation of plano-multiradius reflective element assembly 130 within exterior mirror housing 140 (such as by a lever control or by a cable control) and hence reposition the rearward field of view of plano-multiradius reflective element assembly 130. Alternately, when actuator 136 comprises an electrically actuated actuator that is electrically operable incorporating at least one motor, control 137 can comprise a switch (which, preferably, is operable under control of the driver seated in cabin 125) or control 137 can comprise a memory controller, as known in the automotive mirror art, that controls actuator 136 to move the position of plano-multiradius reflective element assembly 130 to a pre-set orientation that suits the rearward field of view preference of an individual driver. Actuator 136 is mounted to bracket 138 which attaches to vehicle body side 111. Plano-multiradius reflective element assembly 130 is positionable by actuator 136 within exterior mirror housing 140.

Figure 11:
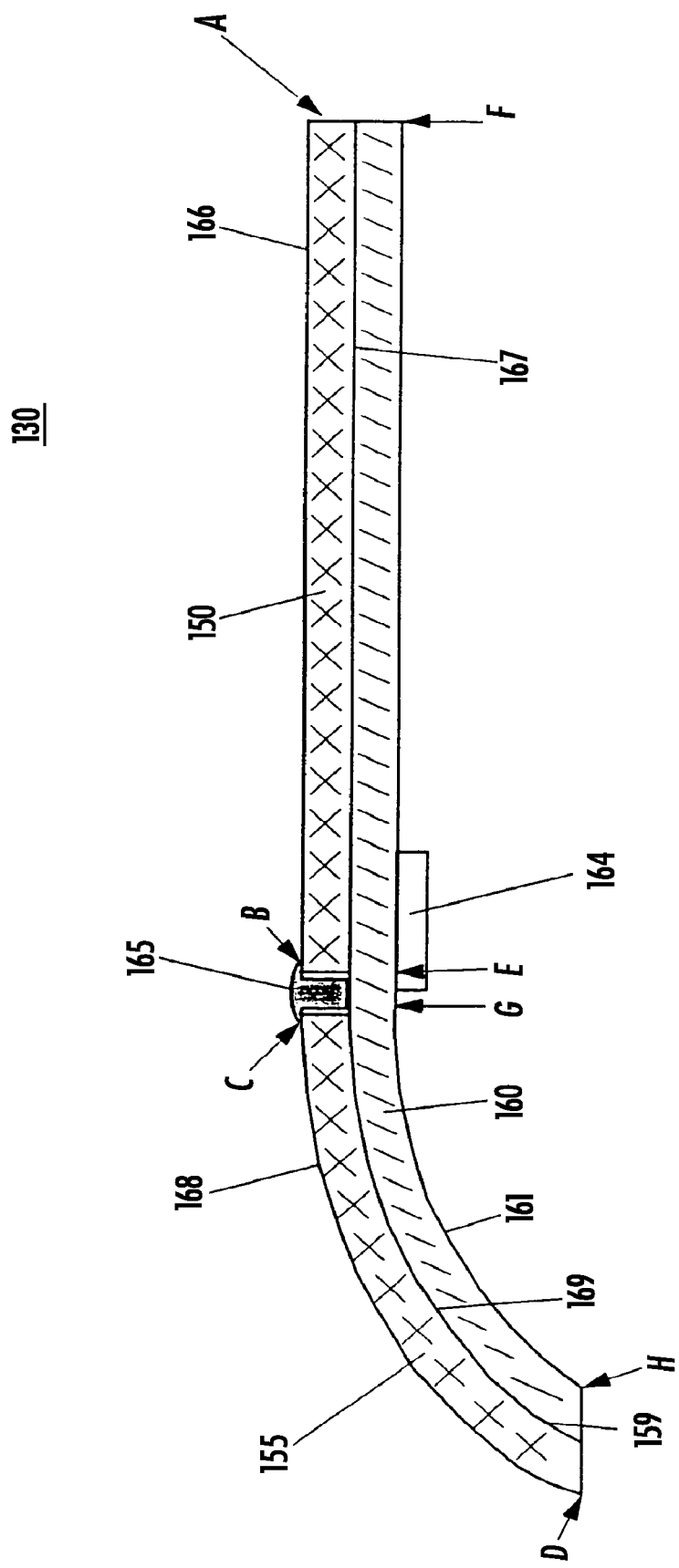
FIG. 11 is an enlarged sectional view of a plano-multiradius reflective element assembly of the mirror assembly in FIG. 10.

Plano-multiradius reflective element assembly 130, as shown in FIG. 11, comprises a plano element 150 and a separate multiradius element 155. Preferably, plano element 150 is adjacent to multiradius element at a joint. At their joint, plano element 150 and separate multiradius element 155 can touch leaving substantially no gap or space therebetween, or plano element 150 and separate multiradius element 155 can be spaced apart at their joint by a space or gap, as in FIG. 11. Plano element 150 and multiradius element 155 are both mounted to surface 159 of, and are both supported by, a single backing plate element 160. Plano element 150 and multiradius element 155 are demarcated apart by demarcation element 165. Surface 161 of backing plate element 160 is preferably adapted to attach, such as by attachment member 164, to actuator 136 when plano-multiradius reflective element assembly 130 is mounted in driver-side exterior sideview mirror assembly 112 (and/or in passenger-side exterior side view mirror assembly 114) such that plano element 150 and multiradius element 155 are adjusted and positioned in tandem and simultaneously when the driver (or alternatively, when a mirror memory system, as is conventional in the rearview mirror arts) activates actuator 136 to reposition the rearward field of view of plano-multiradius reflective element assembly 130. Thus, since elements 150, 155 are part of plano-multiradius reflective element assembly 130, movement of plano-multiradius reflective element assembly 130 by actuator 136 simultaneously and similarly moves plano element 150 and multiradius element 155.

Plano element 150 preferably comprises a flat reflector-coated glass substrate having unit magnification, and comprises a reflective surface through which the angular height and width of the image of an object is equal to the angular height and width of the object when viewed at the same distance (except for flaws that do not exceed normal manufacturing tolerances). Plano element 150 may comprise a conventional fixed reflectance mirror reflector or it may comprise a variable reflectance mirror reflector whose reflectivity is electrically adjustable. For example, plano element 150 may comprise a flat glass substrate coated with a metallic reflector coating such as a chromium coating, a titanium coating, a rhodium coating, a metal alloy coating, a nickel-alloy coating, a silver coating, an aluminum coating (or any alloy or combination of these metal reflectors). The metal reflector coating of plano element 150 may be a first surface coating (such as on surface 166) or a second surface coating (such as on surface 167), as such terms are known in the mirror art. The reflector coating on plano element 150 may also comprise a dielectric coating, or a multilayer of dielectric coatings, or a combination of a metal layer and a dielectric layer to faun automotive mirror reflectors as known in the automotive minor art. If a variable reflectance reflector element, plano element 150 preferably comprises an electro-optic reflector element and, most preferably, an electrochromic reflector element.

When mounted into exterior side view mirror assembly 112 and/or 114, plano-multiradius reflective element assembly 130 is preferably orientated so that at least a portion of (more preferably a substantial portion of) the reflector surface of plano element 150 is positioned closer to the vehicle body (and hence to the driver) than any portion of the reflector surface of multiradius element 155. Thus, and referring to FIG. 11, side A of plano element 150 of plano-multiradius reflective element assembly 130 is positioned closer to the driver than side D of multiradius element 155 when plano-multiradius reflective element assembly 130 is mounted on an automobile. Also, when mounted into exterior side view mirror assembly 112 and/or 114, surfaces 166, 168 of plano-multiradius reflective element assembly 130 face rearwardly in terms of the direction of vehicle travel.

Multiradius element 155 of plano-multiradius reflective element assembly 130 preferably comprises a curved/bent mirrored glass substrate. The degree of curvature preferably increases (and hence the local radius of curvature decreases) across the surface of multiradius element 155 with the least curvature (largest radius of curvature) occurring at the side of multiradius element 155 (side C in FIG. 11) positioned adjacent its joint to plano element 150 when both are mounted on backing plate element 160. Thus, and referring to FIG. 11, the local radius of curvature at side C of multiradius element 155, when mounted on backing plate element 160, is larger than at side D. Also, the local radius of curvature preferably progressively decreases across multiradius element 155 from side C to side D. Preferably, the local radius of curvature at side C of multiradius element 155 is at least about 1000 mm; more preferably is at least about 2000 mm and most preferably is at least about 3000 mm whereas the local radius of curvature at side D of multiradius element 155 is, preferably, less than about 750 mm, more preferably less than about 350 mm; most preferably less than about 150 mm. Preferably, multiradius element 155 comprises a bent glass substrate with radii of curvature in the range of from about 4000 mm to about 50 mm. The multiradius prescription for the multiradius element to be used in a particular exterior mirror assembly can vary according to the specific field of view needs on a specific automobile model.

The total field of view rearwardly of the automobile of the plano-auxiliary reflective element assembly (which is a combination of the field of view of the plano reflective element and of the auxiliary reflective element) preferably generally subtends an angle of at least about 20 degrees (and more preferably, generally subtends an angle of at least about 25 degrees and most preferably, generally subtends an angle of at least about 30 degrees) with respect to the side of an automobile to which is attached an exterior sideview mirror assembly equipped with the plano-auxiliary reflective element assembly.

Multiradius element 155 may comprise a conventional fixed reflectance mirror reflector or it may comprise a variable reflectance mirror reflector whose reflectivity is electrically adjustable. For example, multiradius element 155 may comprise a flat glass substrate coated with a metallic reflector coating such as a chromium coating, a titanium coating, a rhodium coating, a metal alloy coating, a nickel-alloy coating, a silver coating, an aluminum coating (or any alloy or combination of these metal reflectors). The metal reflector coating of multiradius element 155 may be a first surface coating (such as on surface 168) or a second surface coating (such as on surface 169), as such terms are known in the mirror art. The reflector coating on multiradius element 155 may also comprise a dielectric coating, or a multilayer of dielectric coatings, or a combination of a metal layer and a dielectric layer to form automotive mirror reflectors as known in the automotive mirror art. If a variable reflectance reflector element, multiradius element 155 preferably comprises an electro-optic reflector element and, most preferably, an electrochromic reflector element.

Also, it is preferable that the thickness of plano element 150 and multiradius element 155 be substantially the same in dimension so that their respective outer surfaces, 166 and 168, are substantially coplanar so that a driver can readily view images in either or both elements. The thickness dimension of elements 150, 155 is determined by the thickness of the substrate (or in the case of laminate-type electrochromic reflective elements, the thickness of the two substrates between which the electrochromic medium is disposed). For example, plano element 150 and/or multiradius element 155 can comprise a reflector coated glass substrate or panel of thickness preferably equal to or less than about 2.3 mm, more preferably equal to or less than about 1.6 mm, most preferably equal to or less than about 1.1 mm. Use of a thinner substrate is beneficial in terms of improving the overall stability/vibration performance of the image seen in plano-multiradius reflective element assembly 130 when mounted to an automobile.

The reflector area of plano element 150 is preferably larger than that of multiradius element 155. Preferably, the width dimension of plano element 150 is larger than the width dimension of multiradius element 155 (both width dimensions measured at their respective widest dimension and with the width of the respective element being gauged with the respective element oriented as it would be orientated when mounted on the automobile). Thus, and referring to FIG. 11, the distance from side A to side B of plano element 150 is larger than the distance from side C to side D of multiradius element 155. Thus, the ratio of the width of plano element 150 to the width of multiradius element 155 is preferably greater than 1; more preferably greater than 1.5; most preferably greater than 2.5 in order to provide a large, unit magnification plano element 150 as the principal rear viewing portion of plano-multiradius reflective element assembly 130 and providing multiradius element 155 as a smaller, auxiliary, separate, wide-angle viewing portion of plano-multiradius reflective element assembly 130. For plano-multiradius reflective element assemblies to be mounted to the exterior sideview assemblies of passenger automobiles used non-commercially and for non-towing purpose, the width of plano element 150 (at its widest dimension) is preferably in the range of from about 50 mm to about 225 mm; more preferably in the range of from about 75 mm to about 175 mm; most preferably in the range of from about 100 mm to about 150 mm.

Backing plate element 160 is preferably a rigid polymeric substrate capable of supporting plano element 50 and multiradius element 155. Backing plate element 160 comprises a flat portion (generally between B and F as shown in FIG. 11) that corresponds to and is aligned with plano element 150. Backing plate element 60 also comprises a curved portion (generally between G and H as shown in FIG. 11) that corresponds to and is aligned with multiradius element 155. Preferably, curved portion G-H of multiradius element 155 is fabricated with a multiradius prescription that is substantially the same as the multiradius prescription of multiradius element 155. Backing plate element 160 is formed as a single element to which elements 150 and 155 are separately attached. Preferably, backing plate element 160 is formed by injection molding of a thermoplastic or a thermosetting polymer resin. Materials suitable to use for backing plate element 160 include unfilled or filled polymeric materials such as glass and/or mineral filled nylon or glass and/or mineral filled polypropylene, ABS, polyurethane and similar polymeric materials. For example, backing plate element 160 can be formed of ABS in an injection molding operation. Plano element 150 can be cut from a stock lite of flat chromium mirror-coated 1.6 mm thick glass. Multiradius element 155 can be cut from a stock lite of multiradiusly-bent chromium mirror-coated 1.6 mm thick glass. Plano element 150 and multiradius element 155 can then be attached (such as by an adhesive attachment such as an adhesive pad or by mechanical attachment such by clips, fasteners or the like) to the already molded backing plate element 160. Alternatively, plano element 150 and multiradius element 155 can each by individually loaded into an injection molding tool. Once loaded, a polymeric resin (or the monomers to form a polymeric resin) can be injected into the mold in order to integrally form backing plate element 160 with elements 150, 155 integrally molded thereto. Integral molding of the backing plate element to plano element 150 and multiradius element 155 (along with any other elements such as the demarcation element 165) in a single integral molding operation, is a preferred fabrication process for plano-multiradius reflective element assembly 130.

Figure 12:
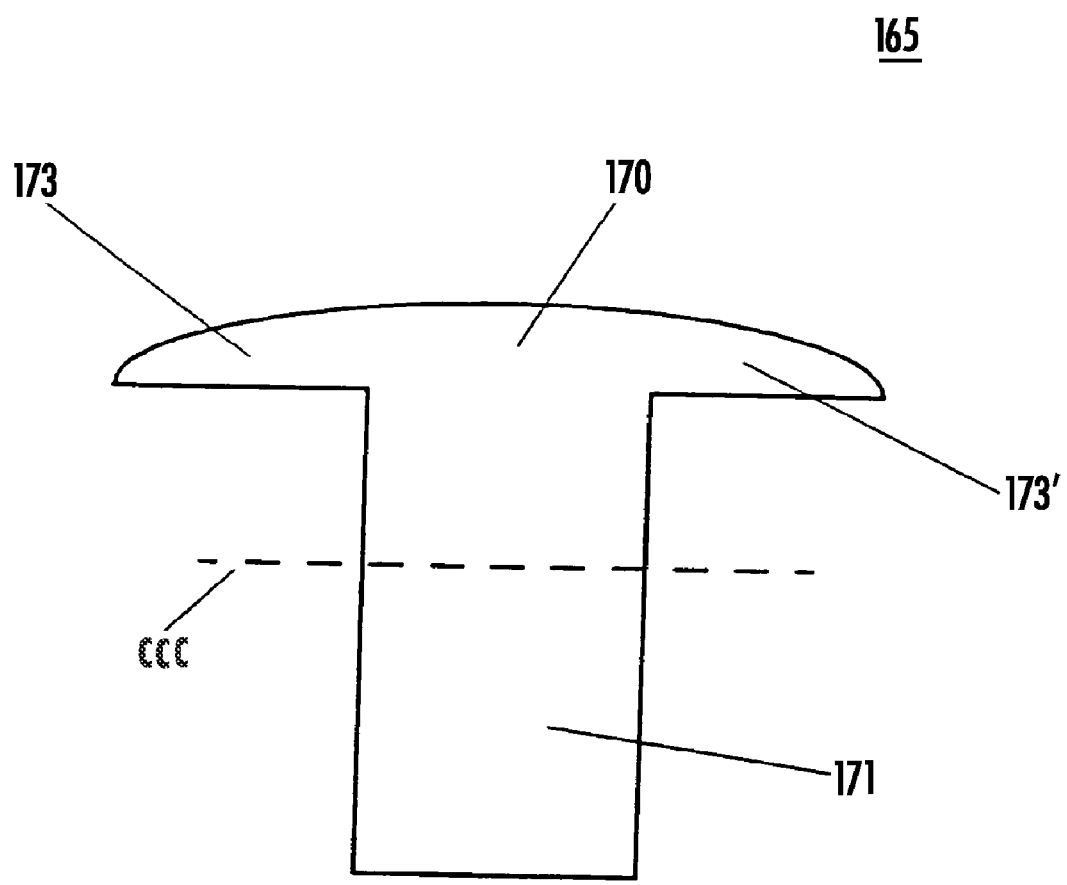
FIG. 12 is an enlarged sectional view of a demarcation element of the plano-multiradius reflective element assembly of FIG. 11.

Plano-multiradius reflective element assembly 130 further preferably includes demarcation element 165 that functions to delineate and demarcate the plano region of the assembly from the wide-angle, multiradius region and also preferably functions to prevent ingress of debris, dirt, water and similar contaminants (such as road splash, car wash spray, rain, snow, ice, leaves, bugs and similar items that plano-multiradius reflective element assembly 130 would be subject to when mounted and used on an automobile) into any gap between plano element 150 and multiradius element 155 when both are attached to backing plate element 160. Optionally, at least a portion of demarcation element 165 can be disposed in any gap between plano element 150 and multiradius element 155 at their joint on backing plate element 160. Preferably, demarcation element 165 is formed of a polymeric material that is dark colored (such as black or dark blue or dark brown or dark grey or a similar dark color) such as a dark colored polypropylene resin or a dark colored nylon resin or a dark colored polyurethane resin or a dark colored polyvinyl chloride resin or a dark colored silicone material. Most preferably demarcation element 165 is formed of an at least partially elastomeric material (such as silicone, or EPDM, or plasticized PVC or the like) in order to provide a degree of vibration dampening for elements 150, 155. As shown in FIG. 12, demarcation element 165 optionally includes a crown portion 170 that includes wing portions 173, 173' and a stem portion 171. Stem portion 171 preferably has a cross-sectional width CCC of less than about 4 mm, more preferably less than about 3 mm and, most preferably less than about 2 mm. Crown portion 170 preferably is dimensioned to not protrude substantially beyond surfaces 166, 168 of elements 150, 155 when demarcation element 165 is installed between elements 150 and 155. Also, wings 173, 173' are preferably dimensioned to protrude (most preferably slightly) onto surfaces 166, 168 of elements 150, 155 when demarcation element 165 is installed between elements 150 and 155 in order to provide a weather barrier seal and/or to at least partially accommodate any dimensional tolerances of elements 150, 155 that could lead to variation in the inter-element gap between sides C and B. While the demarcation element shown in FIG. 12 is one embodiment, other constructions are possible including a demarcation element that has minimal or no crown portion. Likewise, a demarcation element can have little or no stem portion, especially when the joint between plano element 150 and multiradius element 155 includes no gap to receive a stem. Also, where a gap at the plano to multiradius joint exists, any stem of the demarcation element can at least partially be disposed in such gap so as to at least partially fill the gap (or it can optionally substantially fill the gap). Optionally, demarcation element 165 is fabricated by injection molding of a polymeric resin. After plano element 150 and multiradius element 155 have been attached to backing plate element 160, a separately formed demarcation element 165 can then be inserted (and secured such as by an adhesive or by a mechanical attachment such as by a fastener) into a space between elements 150 and 155. Note that, optionally, side B of plano element 150 and side C of multiradius element 155 can touch (leaving substantially no gap or space therebetween). In such a situation, demarcation element 165 can comprise a dark colored strip such as of a tape or of a plastic film that covers the joint between elements 150 and 155. Alternatively, demarcation element 165 can comprise a preferably dark-colored paint, lacquer, caulk or similar material that can be applied to, and that can preferably fill into, the joint between elements 150 and 155. The width of the portion of demarcation element 165 that is visible to the driver is preferably less than about 4 mm, more preferably less than about 3 mm and most preferably less than about 2 mm, but is equal to or greater than about 0.5 mm, more preferably is equal to or greater than about 0.75 mm, most preferably is equal to or greater than about 1 mm in order to provide adequate demarcation of the plano region from the multiradius radius region without unduly obscuring the rearward field of view of the respective elements. Optionally, demarcation element 165 can be formed as part of backing plate element 160 such as by forming demarcation element 165 as a wall structure of the backing plate element that partitions backing plate element 160 into two regions: A first region adapted to receive plano reflective element 150 and a separate and adjacent second region adapted to receive multiradius reflective element 155.

Thus, and referring to FIG. 14, a second embodiment of plano-multiradius reflective element assembly 130' may include a backing plate element 160' which comprises a plate molded from a polymer resin (such as a polyolefin such as polypropylene or such as ABS or nylon) with a demarcation element 165' that is molded as a wall structure that partitions backing plate element 165' into a first region (from CC to BB) adapted to receive and accommodate plano reflective element 150' and into a second region (from BB to AA) adapted to receive and accommodate wide-angle optic multiradius reflective element 155'. Note that section AA to BB of backing plate element 160' is angled to section BB to CC. Such angling of the auxiliary reflective element relative to the plano element can be advantageous in allowing the auxiliary reflective element view a portion of the road adjacent the automobile that is in a blind spot of the plano reflective element. In this regard, it is preferable that the multiradius element be angled away from the plane of the plano element, as shown in FIG. 14 by the angling of section AA to BB to section BB to CC.

Preferably, demarcation element 165 is formed in an integral molding operation, along with formation of backing plate element 160, and attachment of elements 150, 155 thereto. For example, plano element 150 and multiradius element 155 can each by individually loaded into an injection molding tool. Once loaded, a polymeric resin (or the monomers to form a polymeric resin) can be injected into the mold in order to integrally form backing plate element 160 with elements 150, 155 integrally molded thereto and, in the same molding operation and in the same tool, also form by molding the demarcation element. Integral molding of the backing plate element to plano element 150 and multiradius element 155 along with creation in the single molding operation of demarcation element 165 (along with any other elements such as attachment member 164) in a single integral molding operation, is a preferred fabrication process for plano-multiradius reflective element assembly 130. By loading all the sub components of plano-multiradius reflective element assembly 130 into a molding tool, and then injecting polymeric resin to form the backing plate, demarcation member and any attachment member, a substantially complete or fully complete plano-multiradius reflective element assembly can be unloaded from the tool at the completion of the integral molding operation (as known in the molding art), thus enabling economy in manufacturing and accommodation of any dimensional tolerances in the sub components. Where integral molding is so used, it is preferable to use a reactive molding operation such as reactive injection molding of a urethane as such reactive injection molding operations occur at relatively modest temperatures.

Plano element 150 and/or multiradius element 155 can comprise a heater element, as known in the automotive mirror art, that is operable to deice/demist surfaces 166, 168. Such heater elements are conventional and can comprise a positive temperature coefficient heater pad, a resistive heater element and/or a conductive coating. Plano element 150 and/or multiradius element 155 can also optionally comprise a scatterproofing member, as known in the automotive mirror art, such as an adhesive tape, to enhance safety in an accident.

Also, plano element 150 and/or multiradius element 155 can comprise a variable reflectance electro-optic element such as an electrochromic mirror reflector. Thus, both element 150 and element 155 can comprise an electrochromic mirror element or either of element 150 and element 155 can comprise an electrochromic mirror element and the other can comprise a fixed reflectance non-variable reflectance mirror element such as a metal reflector coated glass panel such as a chromium coated glass substrate. Also, if both plano element 150 and multiradius element 155 comprise an electro-optic element such as an electrochromic mirror element capable of electrically dimmable reflectivity, both elements 150, 155 can dim together and in tandem under control of a common dimming control signal (typically provided by an electro-optic automatic dimming interior mirror assembly mounted in the cabin of the automobile and equipped with photosensors to detect incident glare and ambient light). Alternately, if both plano element 150 and multiradius element 155 comprise an electrooptic element such as an electrochromic mirror element capable of electrically dimmable reflectivity, element 150 can dim independently of element 155 (such as is disclosed in U.S. Pat. No. 5,550,677, the entire disclosure of which is incorporated by reference in U.S. Pat. No. 6,717, 712, incorporated herein above). If either or both of elements 150, 155 comprise an electrochromic element, preferably, the electrochromic reflective element comprises a front substrate and a rear substrate with an electrochromic medium disposed between, such as a solid polymer matrix electrochromic medium such as is disclosed in U.S. patent application Ser. No. 09/350,930, filed Jul. 12, 1999, entitled "ELECTROCHROMIC POLYMERIC SOLID FILMS, MANUFACTURING ELECTROCHROMIC DEVICES USING SUCH FILMS, AND PROCESSES FOR MAKING SUCH SOLID FILMS AND DEVICES" to Desaraju V. Varaprasad et al., now U.S. Pat. No. 6,154,306, or such as is disclosed in U.S. Pat. Nos. 5,668,663; 5,724,187; 5,910,854; and 5,239,405, the entire disclosures of which are incorporated by reference in U.S. Pat. No. 6,717,712, incorporated herein above. Most preferably, in such laminate-type electrochromic mirror reflective elements, the front substrate comprises a glass plate of thickness less than about 1.6 mm, most preferably about 1.1 mm thickness or lower, and the rear substrate comprises a glass plate of thickness equal to or greater than about 1.6 mm, more preferably greater than about 1.8 mm thickness, most preferably equal to or greater than about 2.0 mm thickness. The rearmost surface of the rear substrate (the fourth surface as known in the mirror art) is reflector coated with a high reflecting metal film such as of aluminum or silver, or an alloy of aluminum or silver. Most preferably, the front-most surface of the rear substrate (the third surface as known in the mirror art) is reflector coated with a high reflecting metal film such as of aluminum or silver, or an alloy of aluminum or silver.

Backing plate element 165 of plano-multiradius reflective element assembly 130 is optionally equipped on its rearmost surface with attachment member 164 to facilitate attachment to the reflector-positioning actuator of the exterior sideview mirror assembly that plano-multiradius reflective element assembly 130 is mounted to. Attachment of plano-multiradius reflective element assembly 130 to the actuator can be by mechanical attachment such as by a tab, clip or fastener, or may be by adhesive attachment such as by a silicone adhesive, a urethane adhesive or a similar adhesive material such as a tape coated on both surfaces with a pressure sensitive adhesive to form a "double-sticky" tape. The exterior sideview mirror assembly, on whose mirror reflector-positioning actuator the plano-multiradius reflective element assembly is mounted, can be a fixedly attached exterior sideview mirror assembly, a break-away exterior sideview mirror assembly and a powerfold exterior sideview mirror assembly, as known in the automotive minor art.

Figure 13A:
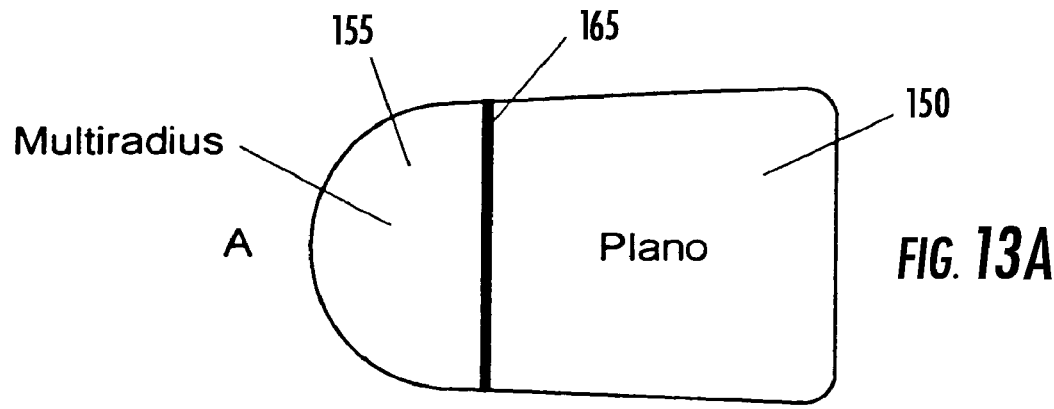
FIGS. 13A-13H illustrate views of various locations for a plano reflective element and an auxiliary reflective element according to this present invention.
Figure 13B:
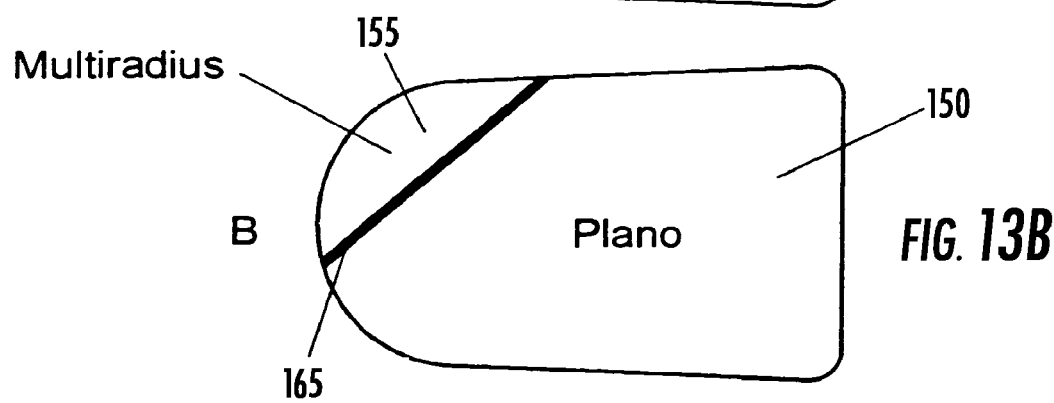
Figure 13C:
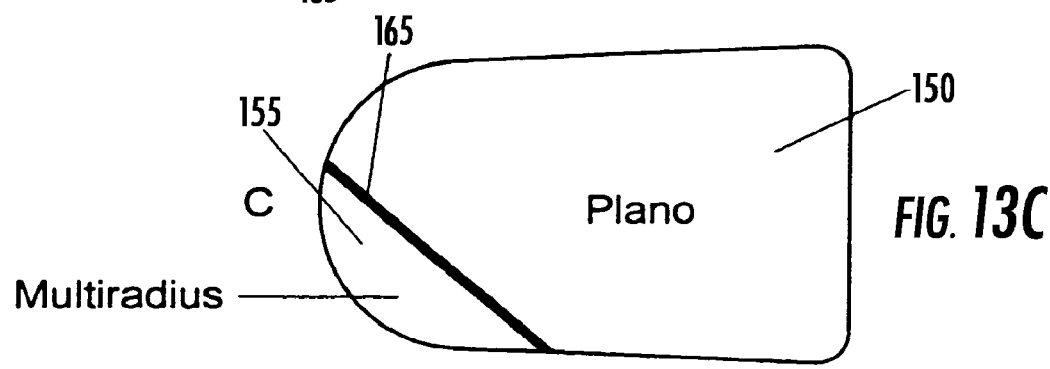
Figure 13D:
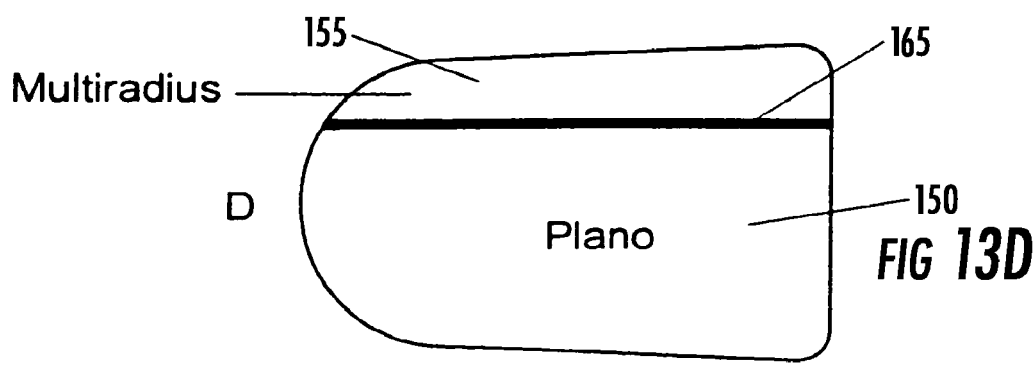
Figure 13E:
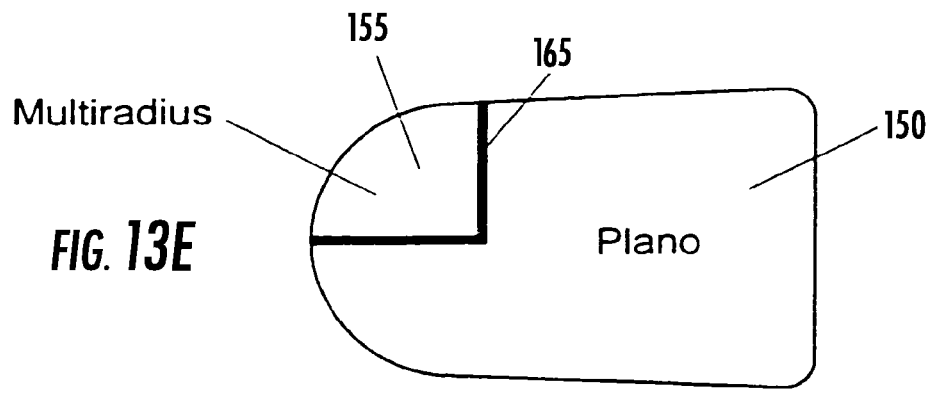
Figure 13F:
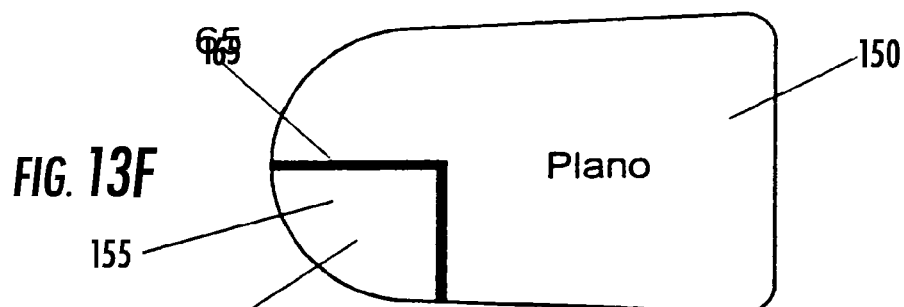
Figure 13G:
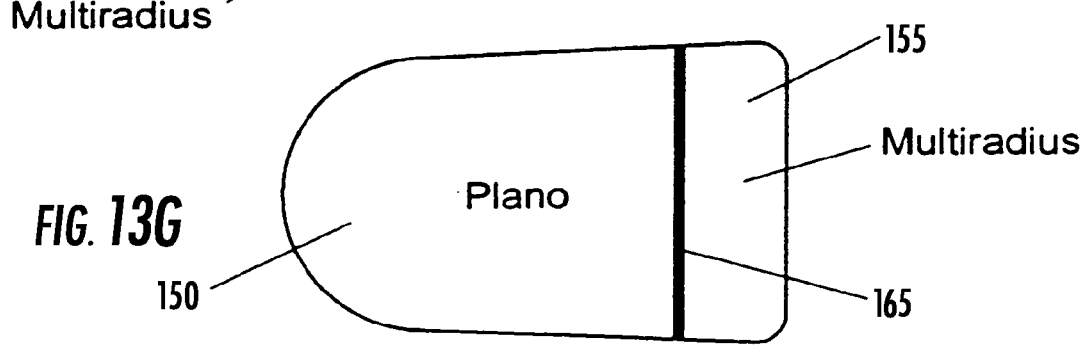
Figure 13H:
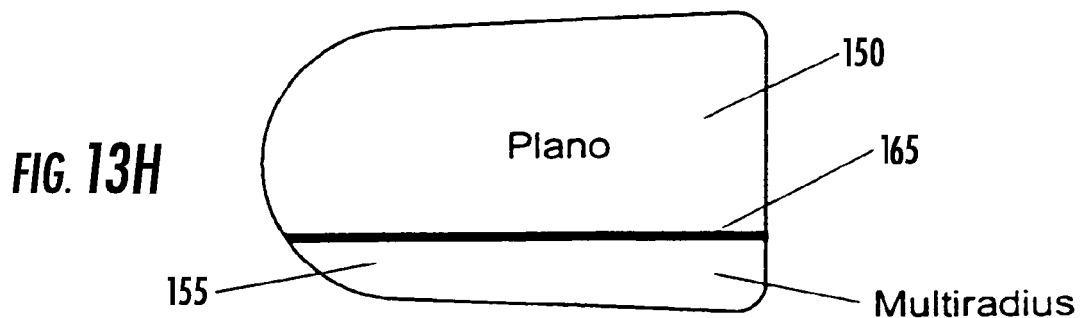

FIGS. 13A-13H shows various arrangements of multiradius reflective element 155 relative to its adjacent plano reflective element 150 (with demarcation element 165 disposed at their joint). In FIGS. 13A, 13B, 13C, 13E and 13F, plano element 150 is mounted wholly inboard of multiradius element 155. Thus, in FIGS. 13A, 13B, 13C, 13E and 13F, plano element 150 would be disposed closer to the vehicle body (and hence to the driver) than multiradius element 155 when plano-multiradius reflective element assembly 130 was mounted in an exterior sideview mirror attached to a side of an automobile. Therefore, in FIGS. 13A, 13B, 13C, 13E and 13F, plano element 150 would be mounted inboard relative to the side of the automobile and multiradius element 155 would be mounted outboard relative to the side of the automobile. In general, the location of the multiradius reflective element in the outboard, upper portion of the plano-multiradius reflective element assembly, as in FIGS. 13B and 13E, is preferred as this allows the plano portion provide a desired rearward field of view along the side of the vehicle. The configuration as shown in FIG. 13G (where the multiradius reflective element is along the inboard side of the assembly) is also desirable as this allows the driver view the side of the vehicle (something many drivers desire in order to have a frame of reference for their rearward field of view) while facilitating having a wide field of view for the plano portion.

Unlike trucks, busses and commercial vehicles the size of an exterior sideview mirror assembly suitable for use on an automobile (and especially when the automobile is not towing a trailer or the like) is restricted. Automobiles generally are non-commercial vehicles intended for personal transportation. Automobiles typically carry 5 passengers or less, although minivans and large sports utility vehicles (which are classified herein as automobiles) can have seat accommodation for up to 10 passengers (although accommodation for 7 passengers or less is more common). The tandem mounting of a plano element of unit magnification and a separate auxiliary element onto a common, single backing plate element, and the mounting of this backing plate element onto an actuator of an exterior sideview mirror assembly so that a driver can simultaneously and similarly move the auxiliary element and the plano element so as to position their respective rearward fields of view, and to achieve this within the relatively restricted space available in a standard automobile-sized exterior sideview mirror assembly is an important element of this present invention. By utilizing a plano element of unit magnification in the plano-multiradius reflective element assembly, and by sizing the reflector area of the plano element larger than the reflector area of the multiradius element and, preferably, by sizing the reflector area of the plano element at a sufficiently large size that the rearward field of view provided by the plano element alone meets and satisfies the minimum field of view requirement mandated by an automaker specification and/or a government regulation, the need to provide a safety warning indicia such as "OBJECTS IN MIRROR ARE CLOSER THAN THEY APPEAR" in the plano element and/or in the multiradius element can be obviated. Preferably, the plano element comprises a reflector surface area of a size sufficient, when mounted as part of a plano-multiradius reflective element assembly in a driver-side exterior sideview mirror assembly on an automobile, to provide the driver of the automobile a view of a level road surface extending to the horizon from a line, perpendicular to a longitudinal plane tangent to the driver's side of the automobile at the widest point, extending 8 feet out from the tangent plane 35 feet behind the driver's eyes (at a nominal location appropriate for any 95th percentile male driver or at the driver's eye reference points established in Federal Motor Vehicle Standard No. 104), with the driver seated in the driver's seat and with the driver's seat in the rearmost position. Also, preferably, the aspect ratio of the plano-multiradius reflective element assembly (defined as the ratio of its largest vertical dimension to its largest horizontal dimension, measured with the plano-multiradius reflective element assembly oriented as it would be oriented when mounted in an exterior sideview mirror assembly on an automobile, and with "horizontal" being generally parallel with the road surface the automobile travels on and "vertical" being generally perpendicular to the road surface the automobile travels on) is preferably less than 1, more preferably less than 0.8, most preferably less than 0.6. Further, it is preferable that the multiradius element be disposed outboard (relative to the side of the vehicle and with the plano-multiradius reflective element assembly oriented as it would be when mounted in an exterior sideview mirror assembly on an automobile) on the plano-multiradius reflective element assembly so that the multiradius element is positioned to provide an auxiliary, wide-angle view of a "blind-spot" region in an adjacent sidelane while the more inboard-disposed plano element with unit magnification provides the principal sideview image to the driver.

Also, it is preferable that the principal axis of the rearward field of view of the multiradius element be different from and angled to the principal axis of the rearward field of view of the plano element when both are attached to the backing plate element of the plano-multiradius reflective element assembly and when the plano-multiradius reflective element assembly is mounted and operated in an exterior sideview mirror assembly on an automobile. Preferably, the principal axis of the rearward field of view of the plano element is directed generally parallel to the road that the automobile equipped with the plano-multiradius reflective element assembly is travelling on (i.e. generally parallel to the longitudinal axis of the automobile) so as to provide the driver with a long-distance view of approaching vehicles in the side lane that the plano element views). However, preferably the principal axis of the rearward field of view of the multiradius element of, for example, a door-mounted driver-side (or passenger-side) exterior sideview mirror assembly in which the plano-multiradius reflective element assembly is mounted is directed generally downwardly towards the road surface adjacent to the driver seating location and/or several feet (such as about 1 foot to about 24 feet; more preferably, about 1 foot to about 12 feet; most preferably about 1 foot to about 8 feet in distance) to its rear (in order to capture a field of view of a rear approaching vehicle that is approaching to overtake, or is about to overtake, or is overtaking the automobile equipped with the plano-multiradius reflective element assembly). Thus, preferably, the principal axis of the rearward field of view of the multiradius element is angled and directed generally downwardly with respect to the longitudinal axis of the automobile and thus is at an angle to the principal axis of the rearward field of view of the plano element. For example, multiradius element 155' when attached to surface 173" of backing plate 160' (see FIG. 14B) would have its principal axis of rearward view as indicated by 180' as in FIG. 14B, and as such would be canted towards the road surface when mounted in an exterior sideview mirror assembly attached to the side of an automobile. By contrast, plano element 150' when attached to surface 174' of backing plate 160' (see FIG. 14A) would have a principal axis as indicated by 185' as in FIG. 14A and, as such, would be generally parallel to the road surface when mounted in an exterior sideview mirror assembly attached to the side of an automobile. Having the multiradius element canted somewhat downwards towards the road surface assists visual detection by the driver of overtaking vehicles in the traditional "blind-spot" in the adjacent side lane. The angle that the multiradius element is angled on the backing plate element of the plano-multiradius reflective element assembly relative to the plane of the plano reflective element will vary from automobile model to model, but generally is preferred to be in the about 1 degree to about 10 degrees range; about 2 degrees to about 8 degrees range more preferred; and about 3 degrees to about 6 degrees range most preferred. In order to conveniently achieve an angling of the multiradius portion with respect to the plano portion (and preferably a downward angling), the portion of the backing plate element that the multiradius reflective element is attached to can be angled relative to the adjacent portion of the backing plate element that the plano reflective portion is attached to. Thus, and referring to FIG. 14, plano-multiradius reflective element assembly 130' includes a molded polymeric backing plate element 160' comprising a generally flat portion 162' (between BB and CC in FIG. 14) and an adjacent curved portion 161' (between AA and BB). As indicated by 190' and 195', portion AA to BB of backing plate element 160' is generally angled to portion BB to CC of backing plate 160'. Preferably, the portion of backing plate element 160' to which the auxiliary reflective element attaches is angled towards the front (compared to the angling of plano reflective element) of an automobile equipped with the plano-auxiliary reflective element assembly of the present invention. FIG. 14 is a view of plano-multiradius reflective element assembly 130' as it would appear from above the vehicle as it would be orientated in use (with portion 162' closer to the driver than portion 161'). The wall section, section XX in FIG. 14, taken through section 162' of backing plate element 160' is of substantially constant dimension (as illustrated in FIG. 14A) whereas the wall section, section YY in FIG. 14B, taken through section 161' of backing plate element 160' is of varying dimension and is angled. Plano reflective element 150' and multiradius reflective element 155' (for example, plano element 150' can comprise an electrochromic mirror element and multiradius element 155' can comprise a chrome coated glass reflector) are attached to portions 162' and 161', respectively. By being supported on the angled face 173" (see FIG. 14B) of portion 161', the principal viewing axis of multiradius reflector element 155' is angled downwards towards the road surface, as compared to the more horizontal-viewing principal viewing axis of plano element 150', when plano-multiradius reflective element 130' is mounted in an exterior sideview mirror assembly on an automobile. Demarcation element 165' is preferably molded in the same molding tool as is used to mold backing plate element 160', and so demarcation element 165' is formed as an integral part of backing plate element 160', forming a wall thereof that partitions the surface of backing plate element 160' into a region for receiving the plano reflective element 150' and a region for receiving the auxiliary reflective element 155'. Also, end-caps 170' and 171' are optionally provided. Plano reflective element 150' can attach into the cavity formed between demarcation element 165' and end-cap 171'; multiradius reflective element 155' can attach into the cavity formed between demarcation element 165' and end-cap 170'. Note that the portion of the backing plate element where the wide-angle optic multiradius element attaches can have a thicker wall thickness than that of the portion of the backing plate element where the unit magnification optic element attaches in order to allow for the angling of the multiradius element downwardly relative to the angle of the plano element, as illustrated in FIGS. 14A-B. As illustrated in FIGS. 14A-B, the angle downwards to the longitudinal axis of the vehicle of the multiradius element can generally be set by an angling of a surface of the backing plate element in order to ensure that the principal axis of the rearward field of view of the plano element is directed generally parallel to the longitudinal axis of an automobile equipped with the plano-multiradius reflective element assembly and that the principal axis of the rearward field of view of the multiradius element is directed generally at an angle downwards to the longitudinal axis of the automobile.

Note that the provision of the plano-multiradius reflective element assembly of this invention as a unitary module has manufacturing advantages, particularly for exterior sideview mirror assembly manufacturers who can procure a plano-multiradius reflective element assembly module from a mirror reflector supplier and then mount the plano-multiradius reflective element assembly module onto an actuator.

Figure 15:
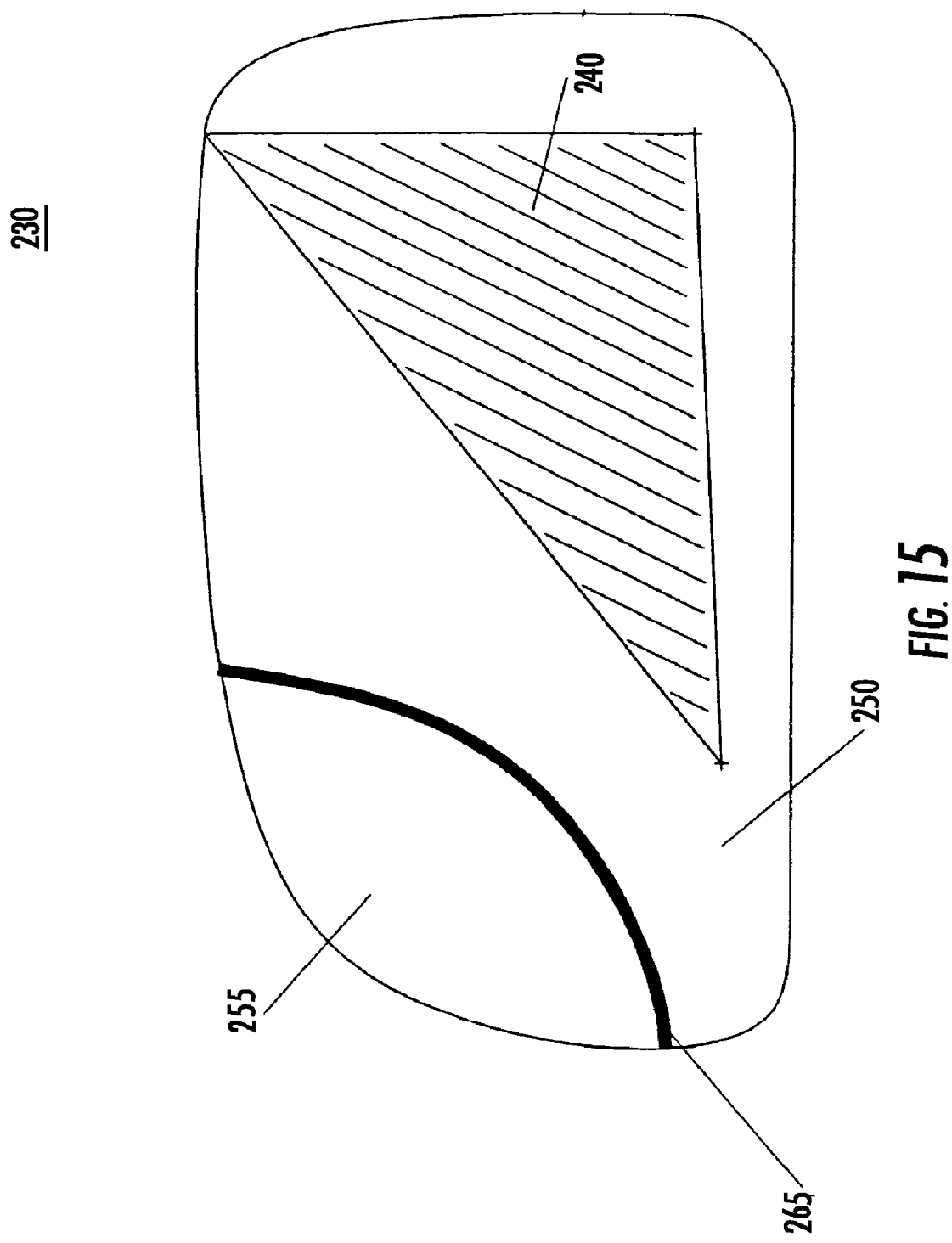
FIG. 15 is a schematic of a third embodiment of a plano-auxiliary reflective element assembly according to this present invention.

Referring to FIG. 15, a third embodiment 230 of a plano-multiradius reflective element assembly is illustrated. Plano-multiradius reflective element assembly 230 includes a plano reflective element 250 and a separate multiradius reflective element assembly 255, both individually attached to a backing plate element, and with demarcation element 265 disposed at their joint. Plano-multiradius reflective element assembly 230 is about 8.5 inches wide and about 4.25 inches tall (aspect ratio of 0.5), at their largest dimension. Shown as the shaded triangle 240 in plano reflective element 250 is the image of a triangular target object set about 35 feet rearward and of width about 8 feet and of height of about 4.1 feet as would be seen were plano-multiradius reflective element assembly 230 mounted in a driver-side exterior sideview mirror assembly in an automobile such as a sports utility vehicle. In general, it is desirable that the plano reflective element be dimensioned and configured so as to have its rearward field of view capture an image (that is visible, by reflection in the plano reflective element, to a driver seated in the driver's seat in an automobile to which is attached an exterior sideview mirror assembly equipped with the plano-auxiliary reflective element assembly according to this present invention) of a triangular shaped target located about 35 feet rearward of the driver seating location, extending about 8 feet out from the plane defined by the side of the automobile and reaching a height of between about 4 feet and about 5 feet from the road surface at that location 35 feet rearward of the automobile. The total field of view rearwardly of the vehicle of plano-multiradius reflective element assembly 230 (which is a combination of the field of view of plano reflective element 250 and of the auxiliary multiradius reflective element 255) preferably generally subtends an angle of at least about 30 degrees (and more preferably, generally subtends an angle of at least about 35 degrees and most preferably, generally subtends an angle of at least about 40 degrees) with respect to the side of an automobile to which is attached an exterior sideview mirror assembly equipped with plano-multiradius reflective element assembly 230.

Figure 16:
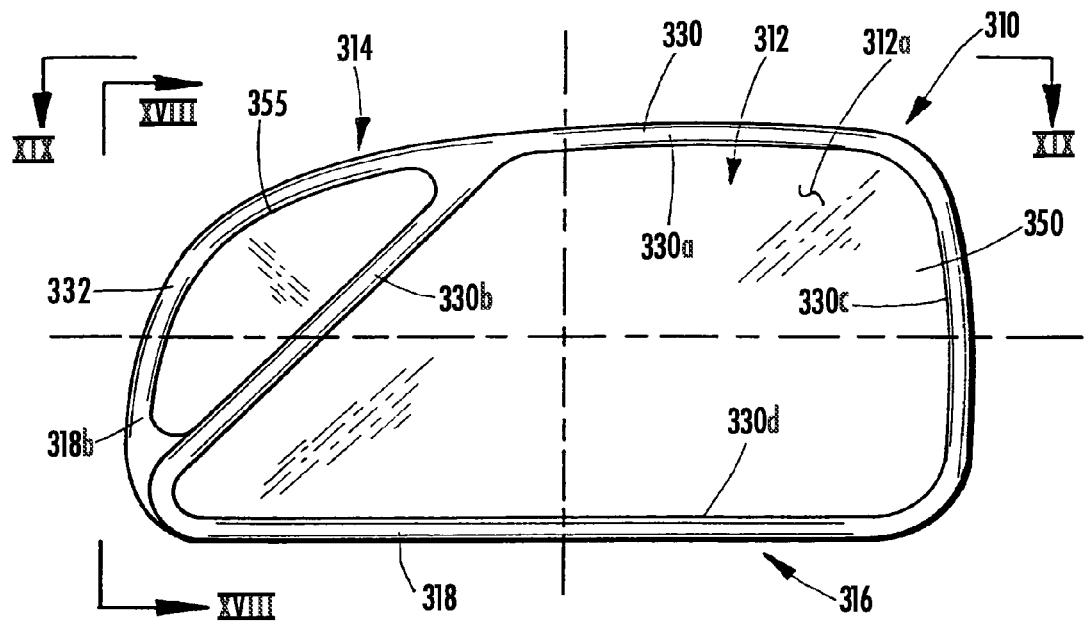
FIG. 16 is a front elevation view of another embodiment of a plano reflective element assembly according to the present invention.

Referring to FIG. 16, another embodiment 310 of the plano-auxiliary reflective element assembly of the present invention is illustrated. Plano-auxiliary reflective element assembly 310 includes a first reflective element 312 and a second or auxiliary, separate reflective element 314 which are together supported in a frame element assembly 316. As will be more fully described below, frame element assembly 316 is adapted such that when reflective elements 312 and 314 are placed, or otherwise positioned, in frame element assembly 316, the angular orientation of each reflective element is pre-established such that during assembly, the assembler need simply place the reflective elements in frame element assembly 316.

In the illustrated embodiment, frame element assembly 316 includes a frame 318 with a forward facing open portion 318a (FIG. 17) (and thus when frame element assembly 316 is mounted in a vehicle-mounted exterior sideview mirror assembly, the forward facing open portion (318a) is facing to the front of the vehicle) through which a reflective element subassembly 317a, which includes reflective element 312, is positioned in frame element assembly 316 and a rearward facing open portion 318b (FIG. 16) (which faces the rear of the vehicle when frame element assembly 316 is mounted in a vehicle mounted exterior sideview mirror assembly) in which a second reflective element subassembly 317b, which includes reflective element 314, is positioned in frame element assembly 316. Frame 318 preferably comprises a molded member formed from a plastic material, such as a reinforced nylon.

In preferred form, first reflective element 312 comprises a plano reflective element 350, such as a flat reflector coated glass substrate, with a reflective surface through which the angular height and width of an image of an object is equal to the angular height and width of the object when viewed to the same distance (except for flaws that do not exceed normal manufacturing tolerances) so as to have a unit magnification. Similar to the previous embodiment, plano reflective element 350 may comprise a conventional fixed reflectance reflective element or may comprise a variable reflectance reflective element who's reflectivity is electrically adjustable, as is known in the art. For example, plano reflective element 350 may comprise a flat glass substrate coated with metallic reflector coating, such as a chromium coating, titanium coating, rhodium coating, metal alloy coating, nickel alloy coating, silver coating, aluminum coating, or any alloy or composition of these metal reflectors. For further details of plano reflective element 350, reference is made to the previous embodiments.

In the illustrated embodiment, reflective element 312 comprises an electrochromic reflective element and includes a first substrate 312a and a second substrate 312b with an electrochromic medium 312c disposed between first and second substrates 312a, 312b. Such suitable electrochromic media include, for example, a solid polymer matrix electrochromic medium as noted in reference to the previous embodiments. Electrical connectors 320a and 320b are coupled to the electrochromic medium 312c to provide a potential across the electrochromic medium which induces the electrochromic medium to darken, as is known in the art. In the illustrated embodiment, reflective element subassembly 317a also includes an optional heater pad 322, which is disposed behind reflective element 312, and a vibration reducing element, such as a foam pad 326, positioned behind heater pad 322, which absorbs vibration of reflective element 312.

Referring again to FIG. 17, frame 318 is adapted to receive and support reflective element subassembly 317a, which is mounted to frame 318 by a backing plate 324, such as a plastic backing plate. In the illustrated embodiment, backing plate 324 mounts to the inner perimeter portion of frame 318 using conventional techniques, such as by adhesive bonding, heat-staking, snap-fit coupling, welding, or the like, to form part of frame element assembly 316. Alternatively, backing plate 324 may mount onto foam pad 326, for example, by an adhesive attachment, such as double sided sticky tape. In which case, reflective element 312 may be mounted to an inner surface of frame 318, such as by an adhesive attachment, including for example a silicone adhesive, with heater pad 322 mounted to reflective element 312, such as by an adhesive attachment, and foam pad 326 mounted to heater pad 322, such as by an adhesive attachment including, for example, double-sided sticky tape.

Figure 17:
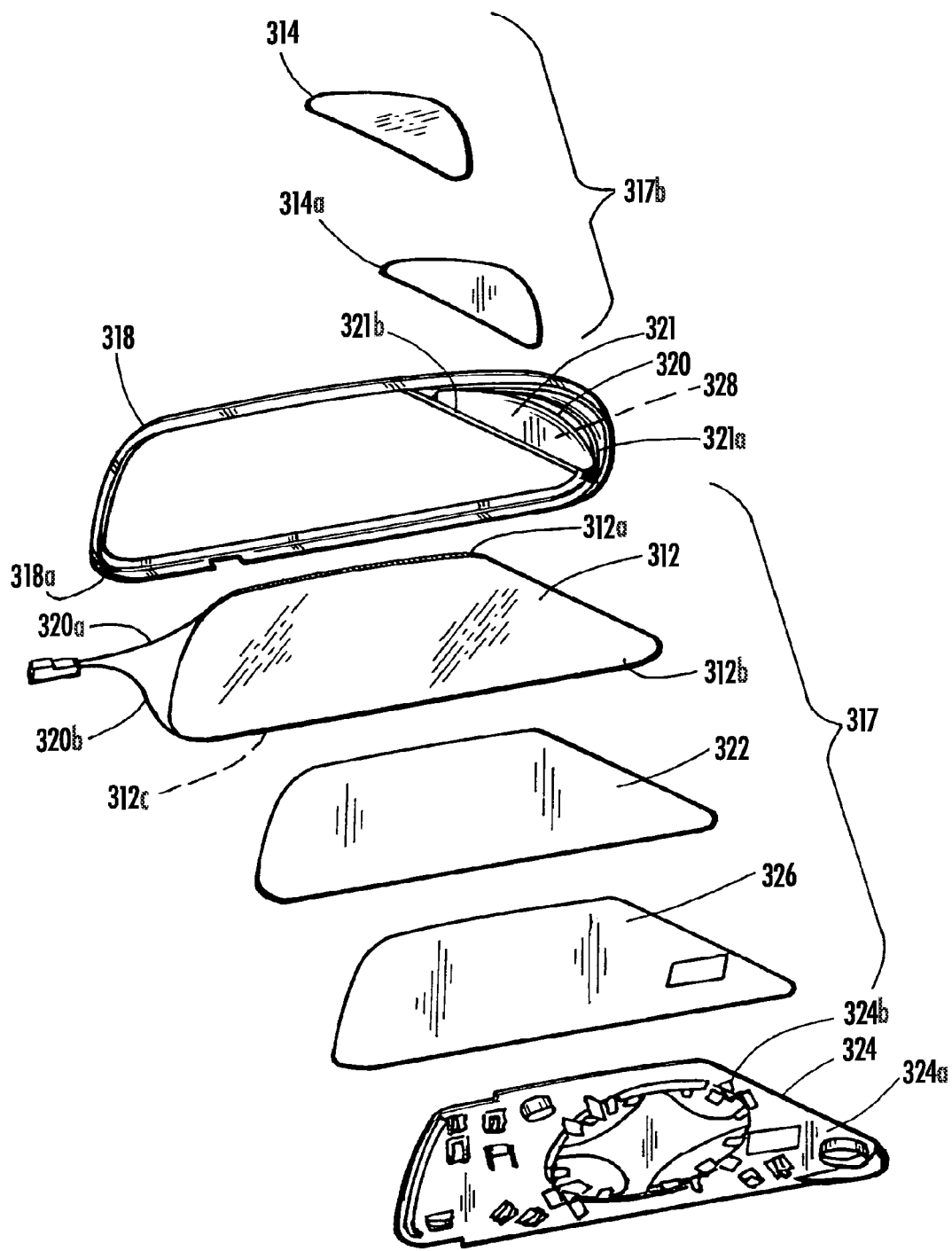
FIG. 17 is an exploded perspective view of the plano reflective element assembly of FIG. 16.

Frame element assembly 316 mounts reflective element assembly 310 in the mirror casing and preferably on an actuator, such as an electric actuator, which permits adjustment to the orientation of reflective element assembly 310 about one or more axis. Examples of suitable actuators are described in U.S. Pat. Nos. 5,900,999; 5,986,364; 6,132,052; 6,037,689; and 6,094,027 and application Ser. No. 09/277,632, filed Mar. 26, 1999, now U.S. Pat. No. 6,229,226, and Ser. No. 09/408,867, filed Sep. 29, 1999, now U.S. Pat. No. 6,243,218, which are incorporated by reference in their entireties in U.S. Pat. No. 6,717,712 (incorporated herein above). Optionally and preferably, backing plate 324 is adapted to engage or be engaged by the actuator for repositioning of plano-auxiliary reflective element assembly 310 about one or more axes. In this manner, the orientation of both reflective element 312 and reflective element 314 are simultaneously adjusted by the actuator. As best seen in FIG. 17, forward facing side 324a of backing plate 324 includes mounting structures 324b which are engaged by the actuator to thereby mount reflective element assembly 310 in the mirror casing.

Referring again to FIG. 16, frame 318 is a unitary frame and includes a first bezel portion 330 which extends around reflective element 312 and a second bezel portion 332 which extends around reflective element 314 to provide styling utility as well as functional utility. In this manner, a portion of forward facing side of frame 318 forms a support surface for reflective element 312, while a portion of rearward facing side of frame 318 forms first bezel portion 330. Similarly, another portion of the rearward facing side of frame provides support for reflective element 314 and also provides bezel portion 332. In addition, a portion of frame 318 forms a demarcation element at the juncture of reflective elements 312 and 314. In the illustrated embodiment, the demarcation element is formed by a section or portion of bezel portion 330, which will be described in greater detail in reference to bezel portion 330. Thus, frame element assembly 316 provides a support function, a positioning function, including an angling function, while also serving to provide styling utility and a demarcation function.

Second reflective element 314 comprises a radiused reflective element and, more preferably, a multiradiused reflective element 355 having a multiradiused curvature. For example; the radii of curvature of reflective element 314 may range from about 4000 mm to about 100 mm and, preferably, range from about 3000 mm to about 150 mm, and, most preferably, range from about 2000 mm to about 200 mm. In addition, reflective element 314 may comprise a fixed reflectance reflective element or may comprise a variable reflectance reflective element who's reflectivity is electrically adjustable. Preferably, reflective elements 312 and 314 include glass substrates, with at least the outer surface of each reflective element comprising glass. However, metalized plastic reflectors may also be used which is especially suitable for reflective element 314. In which case, the reflective element (314) would be especially suitable for molding in or along with frame 318, with the preformed metalized substrate forming reflective element 314 being placed into the mold forming frame 318. For further details of other suitable reflective elements, reference is made to the previous embodiments. In addition to reflective element 314, reflective element subassembly 317b includes a vibration reducing element, such as a foam pad 314a, which is positioned behind reflective element 314. Similar to reflective element 312, foam pad 314a is attached to reflective element 314 by an adhesive attachment, such as a double-sided sticky tape and, similarly, is attached to frame 318 as will be more fully described below.

Figure 18:
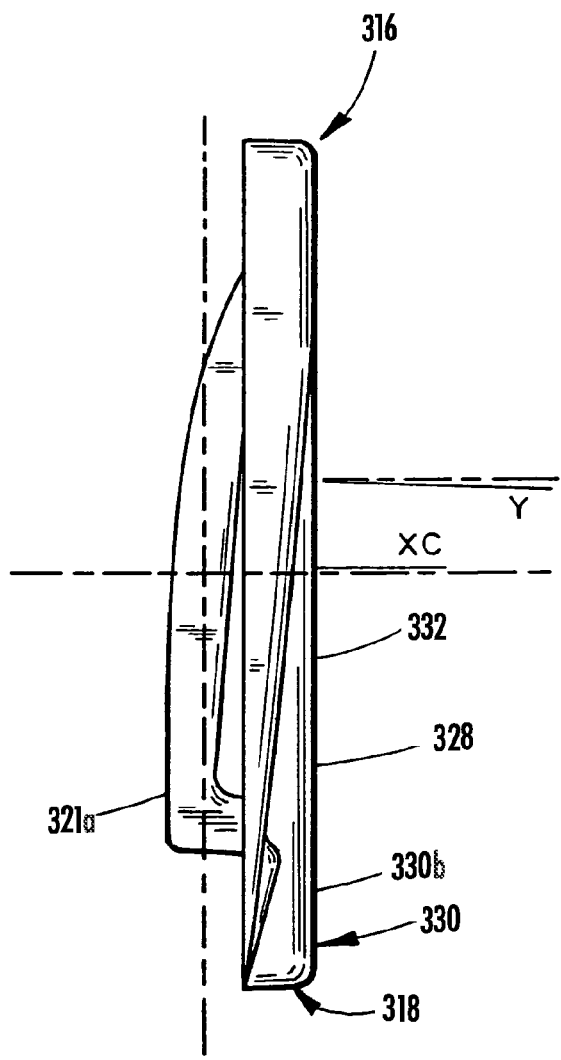
FIG. 18 is an end view of the plano reflective element assembly of FIG. 16 as viewed from line XVIII-XVIII of FIG. 16.

As noted above, frame 318 includes a first bezel portion 330 and a second bezel portion 332. In addition, frame 318 includes an auxiliary support element 320 that provides a mounting surface or support surface for reflective element subassembly 317b. As best seen in FIGS. 17 and 18, support element 320 includes a recessed support surface 328 which is angled to provide an angled support surface for reflective element subassembly 317b. Thus, when reflective subassembly 317b is positioned on and mounted on support surface 328, such as by an adhesive attachment between foam pad 314a and support surface 328, the orientation of reflective element 314 is established by the angle of the support surface. Optionally, support element 320 includes gussets 321a and 321b which project forwardly from the forward facing side of frame 318 to thereby reinforce support surface 328.

Referring to FIG. 16, first bezel portion 330 includes an upper portion 330a, two side portions 330b and 330c, and a lower portion 330d. Side portion 330b forms an acute angle with respect to the lower portion 330d and an obtuse angle with respect to upper portion 330a and together with upper portion 330a, side portion 330c, and lower portion 330d form a perimeter around reflective element 312 to thereby form a styling feature. Second bezel portion 332 extends outwardly from upper portion 330a and downwardly to lower portion 330d of first perimeter portion 330 and together with side portion 330b forms a perimeter around second reflective element 314. Support element 320 extends behind and between side portion 330b and second bezel portion 332 so that reflective element 314 is recessed behind side portion 330b and bezel portion 332.

As best seen in FIG. 18, upper portion 330a, side portions 330b and 330a, and lower portion 330d are substantially coplanar and together define an outer surface below which reflective element 312 is recessed when reflective element 312 is mounted in frame 318. In contrast, perimeter portion 332 is angled forwardly with respect to the plane in which upper portion 330a, side portions 330b and 330c, and lower portion 330d lie. It should be understood that the terms "forwardly", "rearwardly" and "downwardly", are used in reference to when the mirror system is mounted in an automobile. Therefore, "forwardly" is a direction heading toward the front of the automobile, "rearwardly" is a direction heading to the rear of the automobile, "outwardly" is a direction away from the side of the vehicle on which the mirror assembly is mounted, and "downwardly" is a direction heading toward the surface on which the vehicle is positioned (such as a ground or road surface). Similarly as noted above, reflective element 314 is recessed below an outer surface of perimeter portion 332 and also below the outer surface of side portion 330b when mounted in frame 318.

Figure 19:
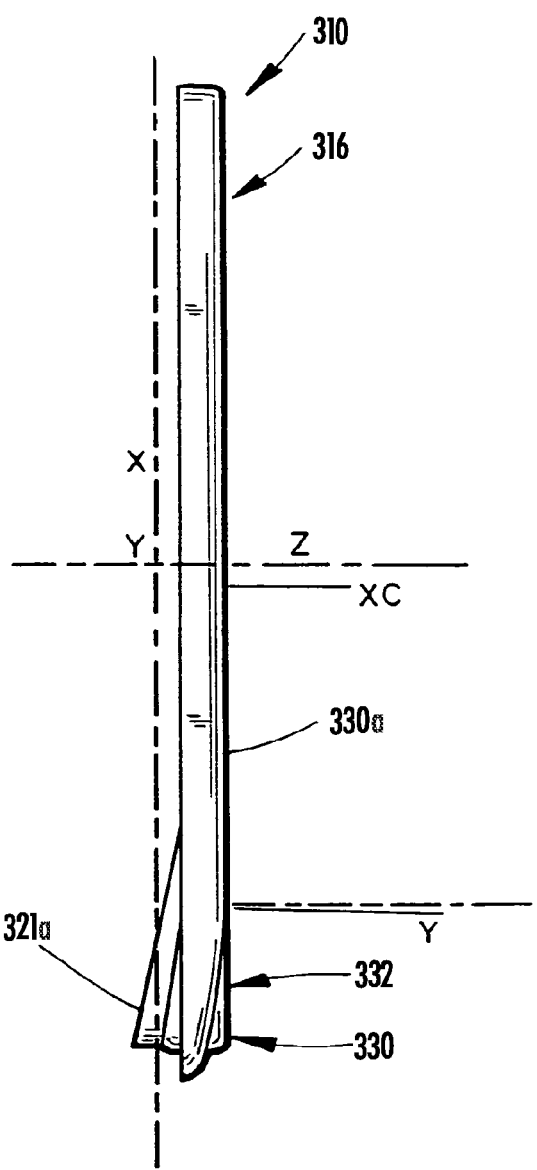
FIG. 19 is a top view of the plano reflective element assembly of FIG. 16 as viewed from line XIX-XIX of FIG. 16.
Figure 20:
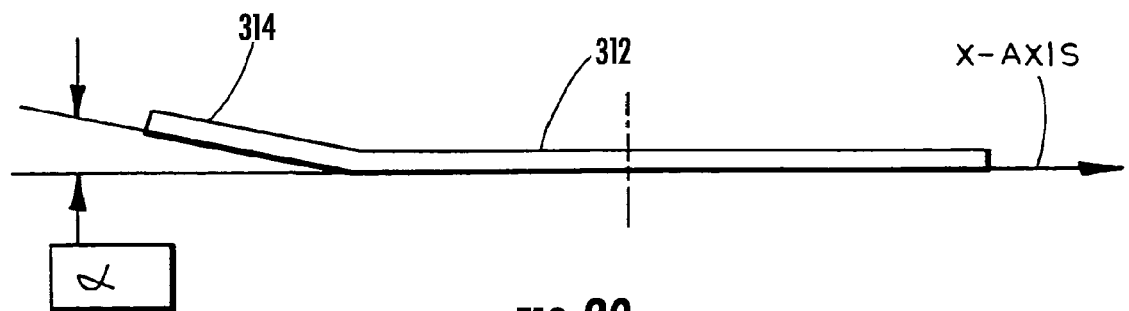
FIG. 20 is a schematic representation of the plano reflective element assembly of FIG. 16 illustrating the orientation of the reflective element.

As would be understood from FIGS. 17-19, support surface 328 is also angled forwardly with respect to back plate 324 and/or reflective element 312 when frame element assembly 316 is mounted in an automobile mounted exterior sideview mirror system. In addition, support surface 328 is also angled or tilted downwardly with respect to reflective element 312 and/or backing plate 324 such that when reflective element 314 is supported on support surface 328, reflective element 314 provides an increased field of view extending laterally or outwardly from the longitudinal axis of the automobile and also downwardly of the longitudinal axis of the automobile.

Figure 21:
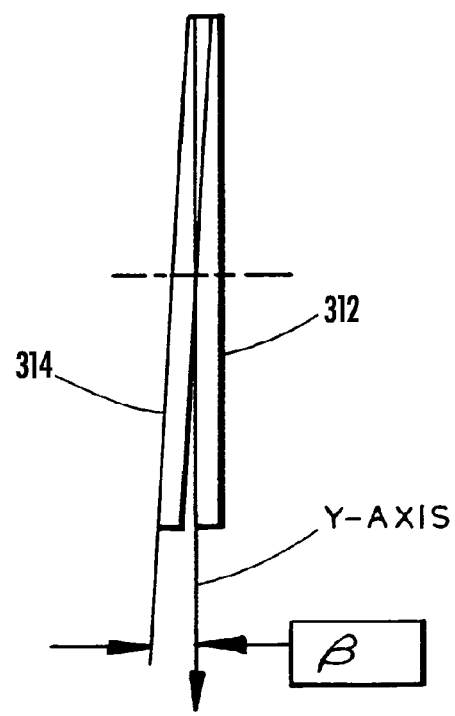
FIG. 21 is another schematic representation of the orientation of the reflective elements of the plano reflective element in FIG. 16.
Figure 22:
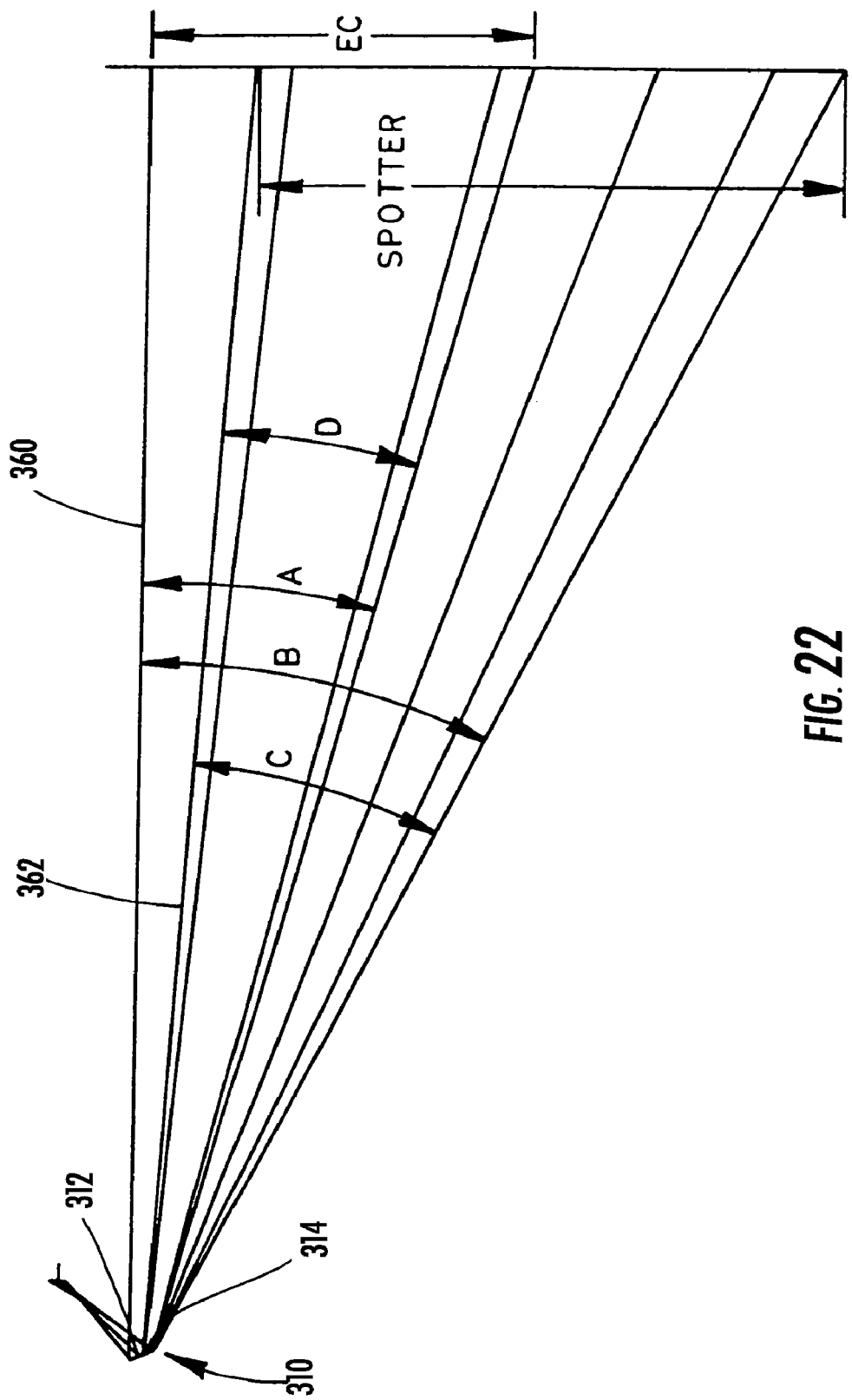
FIG. 22 is a diagram illustrating the range of viewing of the reflective elements of the plano reflective element assembly of FIG. 16.

Referring to FIGS. 21 and 22, support surface 328 is configured such that reflective element 314 is tilted forwardly at an angle α with respect to the X-axis of reflective element 312. In one form, angle α is in a range of about 0.75 degrees to about 5 degrees. In another form, angle α is in a range of about 1 degree to about 3 degrees. In yet another form, angle α is in a range of about 1.25 degrees to about 2.5 degrees. Reflective element 314 is also tilted downwardly with respect to the Y-axis of reflective element 312 at an angle β. In one form, angle β is in a range of about 0.75 degrees to about 5 degrees. In another form, angle β is in a range of about 1.5 degrees to about 3.5. In yet another form, angle β is in a range of about 2 degrees to about 3 degrees. With the tilted orientation of reflective element 314, reflective element 314 provides a field of view with a principal axis that sweeps outwardly and downwardly with respect to the principal axis of the field of view of reflective element 312.

In the illustrated embodiment, support surface 328 is provided by a plate member 321. Plate member 321 may comprise a solid plate member or a foraminous plate member. In the illustrated embodiment, plate member 321 is integrally formed with perimeter portions 330 and 332 during the molding process of frame 318. As previously noted, frame 318 includes a rearwardly facing opening 318b through which reflective element 314 is inserted for placement on support surface 328. For example, reflective element 314 may be positioned in frame 318 on support surface 328 during the molding process of frame 318, such as by insert molding, or may be inserted into frame 318 before the plastic material forming frame 318 is fully cured and is still pliable. In which case, reflective element subassembly 317b is mounted to auxiliary support 320 by an adhesive attachment or a mechanical attachment. Alternatively, support surface 328 may be formed by peripheral flange or a frame. In this manner, reflective element subassembly 317b may be placed in frame 318 from its forward facing side.

Referring to FIG. 22, when reflective element assembly 310 is mounted in a vehicle reflective element 312 has a field of view 360 which forms an angle A with respect to the longitudinal center line of the vehicle in a range of about 8 degrees to about 20 degrees. In another form, angle A is in a range of about 10 degrees to about 18 degrees. In yet another form, angle A is in a range of about 12 degrees to about 16 degrees. Similarly, reflective element 314 has a field of view 362 which forms an angle C in range of about 15 degrees to about 50 degrees. In another form, angle C is in a range of about 15 degrees to about 35 degrees. In yet another form, angle C is in a range of about 15 degrees to about 25 degrees. Consequently, the overall field of view of reflective elements 312 and 314 extends over an angle B, which ranges from about 8 degrees to about 50 degrees in one form, about 10 degrees to about 35 degrees in another form, and about 12 degrees to about 25 degrees in yet another form. Furthermore, field of views 360 and 362 overlap over a range having angle D in a range of about 20 degrees to about 2 degrees, or in a range of about 15 degrees to about 5 degrees. In another form, angle D is in a range of about 10 degrees to about 8 degrees.

From the foregoing, it can be appreciated that reflective elements 312 and 314 provide a wider field of view than a wholly planar rearview mirror element that fully accommodates an equivalent frame having similar dimensions. In addition, because reflective elements 312 and 314 have overlapping field of views, an image in the field of view of reflective element 314 will transition or move between the reflective elements and appear in both reflective elements during the transition to thereby enable the driver of the automobile to view or be conscious of the object continuously. In the illustrated embodiment, reflective element 314 is positioned in an outboard position relative to reflective element 312; therefore, when a vehicle or object that is approaching the automobile from the rear and to some extent from the side, the image of the approaching object will first appear in reflective element 312, then appear in both reflective elements 314 and 312, and then move to reflective element 314 so that the driver will be initially aware of the approaching object when its image first appears in reflective element 312 and continue to be aware of the object as it moves closer to the automobile, thus increasing the range of viewing of the driver. Since the image transitions smoothly from reflective element 312 to reflective element 314, the driver's awareness of the object is continuous and, further, the driver is not distracted from sudden transitions that often occur with conventional spotter mirrors. Typically, when an object "falls" or "drops" out, a driver's consciousness of the object reduces significantly, if not ceases, which is one of the causes of many automobile blind spot accidents. Hence, when combined with the field of view of an interior rearview mirror system, the present invention reduces, if not eliminates, an automobile's blind spot. For further discussion of blind spots in vehicle rearview mirror systems, reference is made to U.S. provisional application entitled VEHICULAR REARVIEW MIRROR SYSTEM, Ser. No. 60/252,149, filed Nov. 20, 2000 by Robert E. Schnell, David K. Willmore, and Richard J. Weber, which is incorporated by reference in its entirety in U.S. Pat. No. 6,717,712 (incorporated herein above). Thus, the plano-auxiliary reflective element assembly provides a seamless rearvision function whereby the image of a side approaching/side overtaking other vehicle is substantially seamlessly maintained as the image of the overtaking or approaching vehicle transitions from being principally and substantially viewed by the driver of the vehicle (the vehicle mounted with the mirror system of the present invention) in the plano reflective element to be seen in the auxiliary reflective element.

Figure 23:
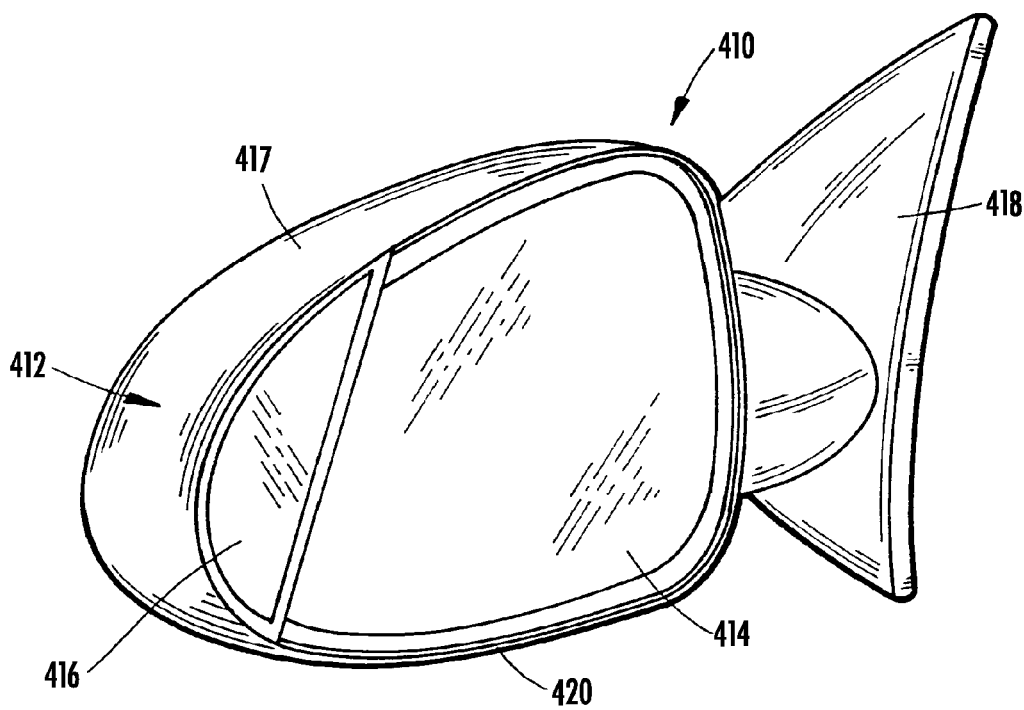
FIG. 23 is a perspective view of another embodiment of an exterior rearview mirror system of the present invention.

Referring to FIG. 23, the numeral 410 generally designates yet another embodiment of an automobile exterior sideview mirror system of the present invention. Exterior sideview mirror system 410 includes a housing 412, a first reflective element 414, and a second or auxiliary, separate reflective element 416, which together provide an increase field of view over conventional planar reflectors mounted in a frame of equivalent dimensions to the combined lateral dimensions of reflective element 414 and 416.

Housing 412 includes a mirror casing 417 and a sail 418, which mounts casing 412 to a side of an automobile. Though illustrated as a fixed mounting arrangement, it should be understood that mirror system 410, like the previous embodiments, may comprise a break-away mirror system or a powerfold mirror system.

In the illustrated embodiment, reflective element 414 comprises a plano reflective element having a unit magnification, similar to the plano reflective elements described in reference to the previous embodiments. Reflective element 416 preferably comprises a wide-angle reflector, such as a convex or aspheric reflector, and may include a multiradiused curvature. For further description of suitable reflectors, reference is made to the previous embodiment.

In the illustrated embodiment, reflective element 416 is mounted in an outboard position relative to reflective element 414 and is fixedly mounted to bezel 420 of mirror casing 417. In addition, reflective element 416 is preferably angled downwardly and forwardly relative to first reflective element 414 when mirror system 410 is mounted to an automobile to thereby increase the field of view of mirror system 410. Optionally and preferably, reflective element 416 is detachably mounted to bezel 420, such as by mechanical fasteners, including clips, so that reflective element 416 can be removed, such as for replacement.

Reflective element 414 preferably comprises an independently positionable reflective element and is mounted by a backing member, such as a backing plate, to an actuator, which provides multi-axis positioning of reflective element 414. In this manner, reflective element 414 and reflective element 416 are separately and independently mounted in housing 412. In addition, reflective element 414 optionally extends behind reflective element 416 in order to maintain the overlap of the field of views of reflective elements 414 and 416 even when reflective element 414 is moved by the actuator. Similar to the previous embodiment, when an object moves toward the automobile, in which mirror system 410 is mounted, from the rear of the automobile or laterally with respect to the automobile, the image of the object will appear initially in reflective element 414. As the object moves closer to the automobile, the image of the object will move from reflective element 414 to reflective element 416 such that when the image transitions between reflective element 414 and reflective-element 416, the image will appear in both reflective elements.

Also, although it is preferable to utilize a multiradius or compound curvature reflective element, such as an aspherical element or a compound curvature element, for the second or auxiliary mirror element adjacent the plano or first reflective element (as this enables least discontinuity in image at the joint between the adjacent elements of the assembly), a spherical reflective element (that has substantially only one radius of curvature and, as such, is a section from a sphere) can optionally be used adjacent the plano reflective element instead of, or in addition to, the multiradius reflective element. Also, a plano auxiliary mirror such as a flat mirrored substrate can be used, less preferably, as a substitute for a multiradius reflective element in those embodiments where the auxiliary reflective element is angled relative to the plane of the principal, plano reflective element so as to view a blind spot region of the principal plano element. Also, the plano-multiradius reflective element assembly can optionally be fixedly attached to an exterior sideview mirror assembly housing that is not movable, or, alternately, the exterior sideview mirror assembly housing to which the plano-multiradius reflective element assembly is fixedly attached can itself be actuated to move, such as by motor action, so that by moving the exterior sideview mirror assembly housing, the field of rearward view of the plano-multiradius reflective element assembly fixedly attached thereto can correspondingly move and be repositioned to suit the field of view need of a particular driver seated in the automobile cabin.

The substrate 18 of the reflective element 12 of the present invention may be formed (such as by casting, extrusion or injection molding) of a polymeric optical resin material, such as an acrylic or polycarbonate resin, a polyolefin, a cyclic olefin copolymer, such as a COC resin known as "TOPAS" and available from Ticona of Summit, N.J. (such as a resin of the type described in U.S. patent application Ser. No. 09/946,228, filed Sep. 5, 2001 for IMPROVED PLASTIC SUBSTRATE FOR INFORMATION DEVICE AND METHOD FOR MAKING SAME, which is hereby incorporated herein by reference) or the like. Because the substrate can be, for example, injection molded from an optical resin, the substrate may be molded or formed to a desired shape having a wide angle or multi-radius surface, which is typically challenging to accomplish with glass sheets. This is because any prescription or form for the substrate can be established in an injection mold by machining, such that when the injection mold is filled with molten injected optical resin material, the optical resin material takes the shape of the mold. Thus, for example, a substrate having a substantially or fully flat inboard region for a multi-radius (often referred to as an aspheric) exterior mirror element is fully practical.

As shown in FIGS. 1-3, inboard portion or surface 18c of exterior surface 18b is positioned at or toward the side of the reflective element that is toward the side body of the vehicle when the mirror assembly is mounted to or attached to the vehicle. The inboard portion 18c of surface 18b of substrate 18 may comprise a substantially flat or slightly curved or less curved surface, such as a surface having a radius of curvature of preferably greater than at least approximately 4000 mm, more preferably greater than at least approximately 9000 mm, and most preferably greater than at least approximately 12000 mm. The inboard surface 18c may provide a field of view of up to approximately 10 degrees, preferably up to approximately 15 degrees, and more preferably up to approximately 20 degrees.

Outboard portion or surface 18d of exterior surface 18b of substrate 18 is positioned outward from inboard portion and is thus further away from the side body of the vehicle when the mirror assembly is mounted to or attached to the vehicle. Outboard portion 18d of exterior surface 18b may be a more convex or curved surface, such that the substrate comprises a wide angle or multi-radius exterior surface substrate. The more curved outboard surface 18d of the substrate may have radii of curvature in the range of less than about 4000 mm to about 100 mm or lower. The more curved outboard portion or surface 18d may provide an extended field of view when combined with the less curved inboard portion or surface 18c. For example, the combined field of view of the mirror reflective element 12 may be preferably greater than at least approximately 25 degrees, more preferably greater than at least approximately 35 degrees, and most preferably greater than at least approximately 45 degrees. The substrate may be formed to have curves or shapes or to provide other field of views, without affecting the scope of the present invention.

The exterior surface 18b of substrate 18 may be coated or covered with a substantially transparent functional film or layer 20, such as an anti-abrasion film or layer, such as an ultrathin glass film or layer or sheet having a thickness of preferably less than or equal to approximately 0.8 mm, more preferably less than or equal to approximately 0.5 mm, and most preferably less than or equal to approximately 0.3 mm. The ultrathin glass film or layer or sheet 20 provides a flexible glass film which can be conformed to the exterior surface of the molded substrate (for example, such as described in U.S. Pat. No. 5,085,907, which is hereby incorporated herein by reference) after the substrate is molded. The ultrathin glass film or layer may provide substantial protection against scratches on the outboard surface, such as may occur due to impact by debris at the outside of the vehicle (for exterior mirror assembly applications) or by use of ice scrapers and the like on the glass surface and the like. The ultrathin glass film or layer may be applied to a molded or extruded strip (such as described below with respect to FIGS. 5-8) or may be applied to the surface or surfaces of a formed or cut substrate, without affecting the scope of the present invention. The flexible ultrathin glass film or layer of the present invention allows the wide angle or multi-radius substrate to be molded in the desired shape out of a transparent acrylic resin material, yet may conform to the curved or multi-radius or aspheric shape and provide enhanced protection or scratch resistance to the substrate.

It is envisioned that other functional films or hard coats or anti-abrasion films or the like may be applied to the exterior surface of the molded substrate, such as via adhering or applying a film to the exterior surface or via dip coating or vacuum deposition or the like. Optionally, a hydrophobic film or hydrophilic film or element or property may also or otherwise be applied to the exterior surface 18b of the substrate. Optionally, the functional film may comprise a non-glass or polymeric film, such as a polymeric material that is a harder and/or different property material than the substrate itself. Optionally, the anti-abrasion film may be formed of the same resin material as the substrate to match the coefficients of thermal expansion and thus reduce thermal expansion/contraction mismatches between the materials.

Optionally, the inner or rear surface 18a of the substrate 18 may have a reflective layer or coating or film or sheet 22 laminated or otherwise applied thereto. For example, the reflective layer or film 22 may comprise a polymeric reflective film 22 laminated or otherwise adhered or applied to the rear or inner surface 18a of a molded or extruded or cast strip (such as described below with respect to FIGS. 5-8) or of the molded or formed substrate 18. Reflective film 22 may comprise a polymeric reflective film, such as an all polymer-thin-film multilayer, high reflective mirror film, such as a multilayer, non-metallic reflective film which may comprise multiple coextrusion of many plastic layers to form a highly reflective mirror film, such as described in U.S. Pat. Nos. 3,773,882; 3,884,606; and 3,759,647, which are hereby incorporated herein by reference. Such a reflective film thus may comprise multilayers of polymer materials to form a highly reflective mirror film, such as a Radiant Light Film, a Radiant Mirror Film or a Radiant Color Film, such as commercially available from 3M of St. Paul, Minn., such as a Radiant Color Film CM590 or CM500. Also, a durable metallized polymeric mirror layer can be used, such as described in U.S. Pat. No. 5,361,172, which is hereby incorporated herein by reference.

Figure 4:
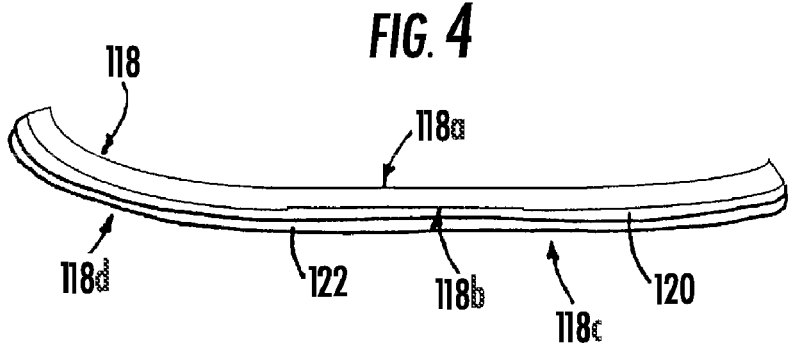
FIG. 4 is a sectional view similar to FIG. 3, showing a wide angle or multi-radius reflective element in accordance with the present invention with a reflective film or layer applied to the exterior surface of the element and an anti-abrasion film or layer applied over the reflective film or layer.

As shown in FIG. 4, it is envisioned that a substrate or substrate shape or sheet or strip of substrate material 118 may have a reflective film or layer 122 adhered or laminated or otherwise applied to the exterior surface 118b of the substrate material. An anti-abrasion film or layer 120 (which may comprise an ultrathin glass film or layer as described above) may be adhered or laminated or otherwise applied to the reflective film or layer 122. In such an application, with the reflective layer on the front or exterior surface of the substrate, the substrate material may be molded or formed of a polymeric material that does not provide optical clarity and need not be transparent. The substrate material may act only as a support or backing plate for the reflective film or layer and the anti-abrasion film or layer and thus may be opaque or non-transparent. The exterior surface 118b of substrate material 118 may comprise a wide angle exterior surface or a multi-radius exterior surface having a less curved inboard portion or surface 118c and a more curved outboard portion or surface 118d, such as discussed above with respect to substrate 18.

Optionally, and such as shown in FIGS. 5, 6 and 8, the optical resin material may be molded or extruded or cast into a generally continuous strip 19 having the desired curved or multi-radius surfaces, and may be cut to form the substrates. The substrates may be cut from the strip via any known cutting process, such as via a laser cutting process or a waterjet cutting process or the like, without affecting the scope of the present invention.

As shown in FIGS. 5-8, the molding processes and film or layer application processes of the present invention may be used to form a prismatic or wedge-shaped strip for forming prismatic or wedge-shaped substrates 18' (FIG. 7) for use in an interior rearview mirror assembly of a vehicle.

As also shown in FIGS. 5-8, the substrate material or optical resin material may be extruded or cast to form the continuous strip or sheet 19. For example, and as shown in FIGS. 5 and 5A, the strip 19 may be extruded by an extruder 24, which, preferably continuously, extrudes the optical resin material through an extrusion nozzle 26. The extruded material may be moved through an annealing lehr 28 to reduce or substantially eliminate birefringence, striation, stress and/or distortion in the strip or substrates. The coatings or layers or films 20 and/or 22 may be applied to one or both surfaces of the strip or substrate after the annealing process. The strip 19 may then be cut, such as via laser cutting or water jet cutting devices or processes 30, or via other forming processes, to form the substrates 18' after the films or coatings have been applied thereto.

Optionally, and as shown in FIG. 8, the strip 19 of optical polymeric resin material may be cast by a caster 32, which deposits the molten polymer or resin material onto a float section 34, such as a heated plate or heated melt. The float section 34 may be angled to form the wedge-shaped strip as the strip or ribbon of cast molten polymer solidifies as it passes across the hot float section (it is also envisioned that the float may provide a curved surface to form the curved outboard surface of the substrate). The coatings or layers or films 20, 22 may be applied to the solidified strip and the strip may be cut to form the substrates after the coatings or layers or films have been applied thereto.

Because the films or layers are flexible, it is envisioned that the anti-abrasion film or ultrathin glass film and/or the reflective polymeric film may be unwound or unrolled and applied along the generally continuously extruded or cast substrate material or strip 19. For example, and as shown in FIGS. 5-8, the ultrathin glass film (or other outer layer anti-abrasion coating or film) 20 may be provided in a reel or roll form or strip 20a and may be unwound or unrolled and laminated or otherwise adhered or applied along the exterior surface 19b of the extruded or cast strip 19 of substrate material. Likewise, the reflective polymeric film 22 may be provided in a reel or roll form or strip 22a and may be attached or applied to the inner surface 19a of the substrate material strip 19, such as via laminating or adhering or otherwise applying the film to the substrate material, such as by using optical adhesive and/or via rolling or ironing the film or sheet (preferably at an elevated temperature and with vacuum assist) onto the substrate or strip surface, to secure the reflective film to the substrate or extruded or cast strip or sheet.

Optionally, the glass film or layer or sheet (or reel or roll of glass sheet or strip) may be coated with a highly reflective metallic layer, such as silver or aluminum or the like, deposited on or applied to its inner surface (i.e., the surface which is adhered to or otherwise applied to the substrate or substrate sheet or strip). The reflective layer or coating may be applied to the glass film or layer with or without transparent overcoats. The glass film thus may provide the reflective layer at the exterior surface of the substrate, such that the reflective layer provides the second layer or surface, with the substrate behind the reflective layer. The glass sheet or film may thus be provided with the reflective mirror coating already applied thereto. The glass layer with reflective layer or coating applied thereto may be provided in a reel or roll form for applying both the reflective layer and the anti-abrasion layer to the exterior surface of the substrate or substrate strip or sheet in one application process. In such an application, the substrate material need not comprise a transparent optical resin material, and a separate reflective layer or film or coating would not be necessary at the inner or rear surface of the substrate.

It is envisioned that other hard coats or films or the like may be applied to one or more surfaces of the molded substrate strip or to the molded and cut substrates, such as via dip coating or vacuum deposition or the like, without affecting the scope of the present invention. The other hard coats or films may be substantially flexible and may be applied via unrolling of a reel of an anti-abrasion film or sheet and applying the film or sheet to a surface of an extruded or cast strip of transparent acrylic resin or the like, as discussed above. Optionally, a hydrophobic film or hydrophilic film or element or property may also or otherwise be applied to (or sprayed on) one or both surfaces 18a, 18b of the substrate or strip or sheet. Optionally, one or both of the reflective polymeric film 22 and the anti-abrasion film 20 may be formed of the same resin material as the substrate 18, 18' or substrate strip 19 to match the coefficients of thermal expansion and thus reduce thermal expansion/contraction mismatches between the materials.

Optionally, it is envisioned that such ultrathin glass films, anti-abrasion films, reflective films or reflective systems may be used for electrochromic mirror reflective elements or cells as well. For example, the interior or exterior rearview mirror assembly of the present invention may comprise an electrochromic mirror, such as an electrochromic mirror assembly and electrochromic element utilizing principles disclosed in commonly assigned U.S. Pat. Nos. 5,140,455; 5,151,816; 6,690,268; 6,178,034; 6,154,306; 6,002,544; 5,567,360; 5,525,264; 5,610,756; 5,406,414; 5,253,109; 5,076,673; 5,073,012; 5,117,346; 5,724,187; 5,668,663; 5,910,854; 5,142,407 and/or 4,712,879, which are hereby incorporated herein by reference, and/or as disclosed in the following publications: N. R. Lynam, "Electrochromic Automotive Day/Night Mirrors", SAE Technical Paper Series 870636 (1987); N. R. Lynam, "Smart Windows for Automobiles", SAE Technical Paper Series 900419 (1990); N. R. Lynam and A. Agrawal, "Automotive Applications of Chromogenic Materials", Large Area Chromogenics: Materials and Devices for Transmittance Control, C. M. Lampert and C. G. Granquist, EDS., Optical Engineering Press, Washington (1990), which are hereby incorporated by reference herein. The mirror assembly may comprise an interior rearview mirror assembly, and may include an accessory module or may be mounted to an accessory module, such as an accessory module of the types disclosed in U.S. patent application Ser. No. 10/355,454, filed Jan. 31, 2003 for VEHICLE ACCESSORY MODULE, now U.S. Pat. No. 6,824,281, which is hereby incorporated herein by reference.

Optionally, the mirror assembly may include one or more displays for displaying information to a driver of the vehicle at or through the reflective element of the mirror assembly. For example, the mirror assembly may include one or more displays of the types described in U.S. Pat. Nos. 6,329,925; 6,501,387; 6,690,268; 5,910,854; 6,420,036; 5,668,663; and 5,724,187, and/or in U.S. patent application Ser. No. 10/054,633, filed Jan. 22, 2002 by Lynam et al. for VEHICULAR LIGHTING SYSTEM, now U.S. Pat. No. 7,195,381; and Ser. No. 10/456,599, filed Jun. 6, 2003 by Weller et al. for INTERIOR REARVIEW MIRROR SYSTEM WITH COMPASS, now U.S. Pat. No. 7,004,593, and/or in PCT Application No. PCT/US03/29776, filed Sep. 19, 2003 by Donnelly Corporation et al. for ELECTROCHROMIC MIRROR ASSEMBLY; PCT Application No. PCT/US03/35381, filed Nov. 5, 2003 by Donnelly Corporation et al. for ELECTRO-OPTIC REFLECTIVE ELEMENT ASSEMBLY; and/or PCT Application No. PCT/US03/40611, filed Dec. 19, 2003 by Donnelly Corporation et al. for ACCESSORY SYSTEM FOR VEHICLE, and/or in U.S. provisional application Ser. No. 60/508,086, filed Oct. 2, 2003 by Schofield for MIRROR REFLECTIVE ELEMENT ASSEMBLY INCLUDING ELECTRONIC COMPONENT; Ser. No. 60/525,952, filed Nov. 26, 2003 by Lynam for MIRROR REFLECTIVE ELEMENT FOR A VEHICLE; Ser. No. 60/471,546, filed May 19, 2003; Ser. No. 60/525,537, filed Nov. 26, 2003; and Ser. No. 60/556,259, filed Mar. 25, 2004, which are all hereby incorporated herein by reference, without affecting the scope of the present invention.

Optionally, the mirror assembly may include or be associated with electronic accessories, such as, for example, antennas, including global positioning system (GPS) or cellular phone antennas, such as disclosed in U.S. Pat. No. 5,971,552, a communication module, such as disclosed in U.S. Pat. No. 5,798,688, a blind spot detection system, such as disclosed in U.S. Pat. Nos. 5,929,786 and/or 5,786,772, a high/low headlamp controller, such as disclosed in U.S. Pat. Nos. 5,796,094 and/or 5,715,093, transmitters and/or receivers, such as a garage door opener or the like, a digital network, such as described in U.S. Pat. No. 5,798,575, a memory mirror system, such as disclosed in U.S. Pat. No. 5,796,176, a hands-free phone attachment, a video device for internal cabin surveillance and/or video telephone function, such as disclosed in U.S. Pat. Nos. 5,760,962 and/or 5,877,897, a remote keyless entry receiver or system or circuitry and/or a universal garage door opening system or circuitry (such as the types disclosed in U.S. Pat. Nos. 6,396,408; 6,362,771; 5,798,688 and 5,479,155, and/or U.S. patent application Ser. No. 10/770,736, filed Feb. 3, 2004 by Baumgardner et al. for GARAGE DOOR OPENING SYSTEM FOR VEHICLE, now U.S. Pat. No. 7,023,322), lights, such as map reading lights or one or more other lights or illumination sources, such as disclosed in U.S. Pat. Nos. 6,690,268; 5,938,321; 5,813,745; 5,820,245; 5,673,994; 5,649,756; 5,178,448; 5,671,996; 4,646,210; 4,733,336; 4,807,096; 6,042,253; and/or 5,669,698, and/or U.S. patent application Ser. No. 10/054,633, filed Jan. 22, 2002 by Lynam et al. for VEHICULAR LIGHTING SYSTEM, now U.S. Pat. No. 7,195,381, microphones, such as disclosed in U.S. Pat. Nos. 6,243,003; 6,278,377; and/or 6,420,975, and/or PCT Application No. PCT/US03/30877, filed Oct. 1, 2003, speakers, a compass or compass system, such as disclosed in U.S. Pat. Nos. 5,924,212; 4,862,594; 4,937,945; 5,131,154; 5,255,442; and/or 5,632,092, and/or U.S. patent application Ser. No. 10/456,599, filed Jun. 6, 2003 by Weller et al. for INTERIOR REARVIEW MIRROR SYSTEM WITH COMPASS, now U.S. Pat. No. 7,004,593, a navigation system, such as described in U.S. Pat. No. 6,477,464, and U.S. patent application Ser. No. 10/456,599, filed Jun. 6, 2003 by Weller et al. for INTERIOR REARVIEW MIRROR SYSTEM WITH COMPASS, now U.S. Pat. No. 7,004,593; Ser. No. 10/287,178, filed Nov. 4, 2002 by McCarthy et al. for NAVIGATION SYSTEM FOR A VEHICLE, now U.S. Pat. No. 6,678,614; Ser. No. 10/645,762, filed Aug. 20, 2003 by Taylor et al. for VEHICLE NAVIGATION SYSTEM FOR USE WITH A TELEMATICS SYSTEM, now U.S. Pat. No. 7,167,796; and Ser. No. 10/422,378, filed Apr. 24, 2003, now U.S. Pat. No. 6,946,978; and/or PCT Application No. PCT/US03/40611, filed Dec. 19, 2003 by Donnelly Corporation et al. for ACCESSORY SYSTEM FOR VEHICLE, a tire pressure monitoring system, such as the types disclosed in U.S. Pat. Nos. 6,294,989; 6,445,287; and/or 6,472,979, and/or in U.S. patent application Ser. No. 10/206,495, filed Jul. 26, 2002 by Schofield et al. for SELF TRAINING TIRE PRESSURE MONITORING SYSTEM, now U.S. Pat. No. 6,731,205, a seat occupancy detector, a trip computer, a telematics system, such as an ONSTAR® system or the like, and/or any other desired accessory or system or the like (with all of the above-referenced patents and patent applications and PCT applications being commonly assigned to Donnelly Corporation, and with the disclosures of all of the above referenced patents and patent applications and PCT applications being hereby incorporated herein by reference in their entireties).

Optionally, a vehicle compass or compass system may comprise a printed circuit board and may be positioned within a pod or the like that may be fixedly mounted in the vehicle. The compass may be initially calibrated (such as at the assembly plant or the like) via a small Helmholtz coil that may accommodate the small circuit board or pod. The coil induces a field to calibrate the compass, such as described in U.S. provisional application Ser. No. 60/467,899, filed May 5, 2003, which is hereby incorporated herein by reference in its entirety. The induced field in the miniature Helmholtz coil may be controlled via the use of a highly permeable magnetic shielding material that may enclose the miniature Helmholtz coil with only a small slot for the circuit board or compass pod to enter through. Such a set up may allow the compass pod manufacturer to automate and magnetically shield the calibration and test stage of a microprocessor-based compass. The calibration process may utilize an indexing rotary table that may rotate to move a compass pod from a loading bay to a calibration bay. The shielded Helmholtz coil may be adjacent to the rotary table and may be shuttled back and forth to align with the rotary table to receive a compass pod therefrom. The rotary table may rotate to move a calibrated compass pod (after it leaves the miniature Helmholtz coil) from the calibration bay to a final functional test station to test the calibrated compass pod.

Therefore, the present invention provides a wide angle or multi-radius single substrate or reflective element which may provide an enhanced field of view for an interior or exterior rearview mirror assembly. The wide angle or multi-radius single element reflector may have an anti-abrasion coating or ultrathin glass film conformed to and applied to the exterior curved surface of the substrate. The substrate may be molded or extruded into the desired shape and may be formed into an elongated strip or sheet, whereby the anti-abrasion coating or film may be applied along the strip before the strip is cut into the desired substrates. The present invention thus provides a single element wide angle or multi-radius substrate which has enhanced scratch resistance. A polymeric reflective film may be laminated, adhered or otherwise applied to the opposite inner surface of the substrate or extruded strip while the anti-abrasion coating or film is applied to the exterior surface. Optionally, a reflective film or layer may be applied to the exterior surface of the substrate and an anti-abrasion film or layer may be applied to the reflective film or layer.

Changes and modifications in the specifically described embodiments can be carried out without departing from the principles of the present invention, which is intended to be limited only by the scope of the appended claims, as interpreted according to the principles of patent law.

The invention claimed is:

1. An exterior sideview minor assembly suitable for vehicular use, said exterior sideview mirror assembly comprising:
   a mirror housing defining a primary opening;
   a single mirror backing plate element within said mirror housing and disposed adjacent to said primary opening;
   said single mirror backing plate element movable by an electrically-operable actuator;
   a main plano mirror element fixedly secured to and supported by said single mirror backing plate element and disposed within said primary opening for providing a view rearward of a vehicle equipped with said exterior sideview mirror assembly through a first primary field of view;
   an auxiliary non-plano curved mirror element fixedly secured to and supported by said single mirror backing plate element and disposed adjacent to said main plano minor element, said auxiliary non-piano curved mirror element defined by a single radius of curvature differing from said main piano mirror element such that said auxiliary non-plano curved minor element provides a second auxiliary field of view rearward of the vehicle equipped with said exterior sideview minor assembly;
   wherein said first primary field of view of said main plano mirror element overlaps said second auxiliary field of view of said auxiliary non-plano curved mirror element;
   wherein said single mirror backing plate element comprises a generally rigid polymeric molding able to support said main piano mirror element and said auxiliary non-piano curved mirror element;
   wherein said single mirror backing plate element comprises a generally flat portion for supporting said main piano mirror element and a curved portion for supporting said auxiliary non-piano curved mirror element;
   wherein said curved portion of said single mirror backing plate element for supporting said auxiliary non-piano curved mirror element is angled relative to said generally flat portion of said single mirror backing plate element for supporting said main piano mirror element in a manner such that, when a driver of a vehicle equipped with said exterior side view mirror assembly aligns the rearward field of view of said main plano mirror element, the rearward field of view of said main piano mirror element is aligned downwardly relative to a vehicle body side to which said exterior side view mirror assembly is attached;
   wherein said main piano mirror element comprises one of (a) a generally flat glass substrate having a surface coated with a metallic reflector coating and (b) a generally flat polymeric substrate having a thin glass element applied to a surface thereof and with an opposing surface thereof having a reflecting layer applied thereto; and
   wherein said curved portion of said single mirror backing plate element defines an auxiliary non-piano curved mirror element backing plate element radius of curvature substantially equal to said single radius of curvature.

2. The exterior sideview mirror assembly of claim 1, including a divider between said main piano mirror element and said auxiliary non-plano curved mirror element that demarcates said auxiliary non-plano curved minor element from said main plano mirror element visually.

3. The exterior sideview mirror assembly of claim 2, wherein said main piano mirror element comprises a generally flat glass substrate having a surface coated with a metallic reflector coating.

4. The exterior sideview mirror assembly of claim 3, wherein said single mirror backing plate element includes a molded wall extending from a surface thereof and wherein said divider comprises at least a portion of said molded wall.

5. The exterior sideview mirror assembly of claim 4, wherein said wall generally circumscribes the circumferential edge of said auxiliary non-plano curved mirror element when said auxiliary non-plano curved mirror element is supported by said single mirror backing plate element.

6. The exterior sideview mirror assembly of claim 1, wherein said main piano mirror element comprises a generally flat glass substrate having a surface coated with a metallic reflector coating and including a bracket configured for fixedly securing said exterior sideview mirror assembly to the vehicle body side.

7. The exterior sideview mirror assembly of claim 1, wherein said main plano mirror element comprises a generally flat polymeric substrate having a thin glass element applied to a surface thereof and with an opposing surface thereof having a reflecting layer applied thereto, and wherein said generally flat polymeric substrate is formed from an elongated sheet of substrate material comprising a polymeric resin material, and wherein said elongated sheet has a substantially transparent functional film applied at a surface thereof, and wherein said substantially transparent functional film provides at least one of (a) an anti-abrasion function, (b) a hydrophobic function and (c) a hydrophilic function, and wherein said functional film comprises an ultrathin glass material which is sufficiently flexible to be provided in a reel or roll, and wherein said functional film is sufficiently flexible to conform to said generally flat polymeric substrate of said main piano mirror element, and said main piano mirror element comprises a reflective film disposed at a surface of said generally flat polymeric substrate opposite said substantially transparent functional film.

8. The exterior sideview mirror assembly of claim 7, wherein said thin glass element comprises a thin flexible glass sheet, said thin flexible glass sheet existing as a pre-formed glass sheet that is separate from said generally flat polymeric substrate, said thin flexible glass sheet having an attaching surface, said attaching surface being opposed to and adhered to said surface of said generally flat polymeric substrate when said thin flexible glass sheet is adhered to said exterior surface of said generally flat polymeric substrate, said thin flexible glass sheet providing an anti-abrasion function at said surface of said generally flat polymeric substrate when adhered thereto, said thin flexible glass sheet substantially conforming to said exterior surface of said generally flat polymeric substrate when adhered thereto, said thin flexible glass sheet having a thickness of less than approximately 0.8 mm and greater than approximately 0.3 mm.

9. The exterior sideview mirror assembly of claim 8, wherein said generally flat polymeric substrate is cut from a molded or extruded or cast elongated sheet, said thin flexible glass sheet being laminated to said elongated sheet and wherein said plano mirror reflective element comprises a reflective film applied to an inner surface of said generally flat polymeric substrate opposite said exterior surface, and wherein said reflective film comprises a polymeric reflective film at least one of laminated, adhered and applied to said inner surface of said generally flat polymeric substrate.

10. An exterior sideview mirror assembly suitable for vehicular use, said exterior sideview mirror assembly comprising:
a mirror housing defining a primary opening;
a single mirror backing plate element within said minor housing and disposed adjacent to said primary opening;
said single mirror backing plate element movable by an electrically-operable actuator;
a main piano mirror element fixedly secured to and supported by said single mirror backing plate element and disposed within said primary opening for providing a view rearward of a vehicle equipped with said exterior sideview mirror assembly through a first primary field of view;
an auxiliary non-plano curved mirror element fixedly secured to and supported by said single mirror backing plate element and disposed adjacent to said main piano mirror element, said auxiliary non-piano curved mirror element defined by a curvature differing from said main plano mirror element such that said auxiliary non-piano curved mirror element provides a second auxiliary field of view rearward of the vehicle equipped with said exterior sideview mirror assembly;
wherein said first primary field of view of said main piano mirror element overlaps said second auxiliary field of view of said auxiliary non-piano curved mirror element;
wherein said single minor backing plate element comprises a generally rigid polymeric molding able to support said main plano mirror element and said auxiliary non-piano curved mirror element;
wherein said single mirror backing plate element comprises a generally flat portion for supporting said main plano mirror element and a curved portion for supporting said auxiliary non-piano curved mirror element;
wherein said curved portion of said single mirror backing plate element for supporting said auxiliary non-piano curved mirror element is angled relative to said generally flat portion of said single mirror backing plate element for supporting said main plano mirror element in a manner such that, when a driver of a vehicle equipped with said exterior side view mirror assembly aligns the rearward field of view of said main piano mirror element, the rearward field of view of said main piano mirror element is aligned downwardly relative to a vehicle body side to which said exterior side view mirror assembly is attached;
wherein said main piano mirror element comprises one of (a) a generally flat glass substrate having a surface coated with a metallic reflector coating and (b) a generally flat polymeric substrate having a thin glass element applied to a surface thereof and with an opposing surface thereof having a reflecting layer applied thereto; and
wherein said curved portion of said single mirror backing plate element defines an auxiliary non-piano curved mirror element backing plate element radius of curvature substantially equal to said curvature of said auxiliary non-plano curved mirror element.

11. The exterior sideview mirror assembly of claim 10, including a divider between said main piano mirror element and said auxiliary non-piano curved mirror element that demarcates said auxiliary non-piano curved mirror element from said main piano mirror element visually.

12. The exterior sideview mirror assembly of claim 11, wherein said single mirror backing plate element includes a molded wall extending from a surface thereof and wherein said divider comprises at least a portion of said molded wall and wherein said wall generally circumscribes the circumferential edge of said auxiliary non-plano curved mirror element when said auxiliary non-piano curved mirror element is supported by said single mirror backing plate element.

13. The exterior sideview mirror assembly of claim 12, wherein said main piano mirror element comprises a generally flat glass substrate having a surface coated with a metallic reflector coating and including a bracket configured for fixedly securing said exterior sideview mirror assembly to the vehicle body side.

14. The exterior sideview mirror assembly of claim 10, wherein said auxiliary non-plano curved mirror element comprises a reflector-coated multiradius curved substrate.

15. The exterior sideview mirror assembly of claim 10, wherein said generally flat portion of said single mirror backing plate element defines a primary plane that is substantially flat and wherein said curved portion of said single mirror backing plate element is substantially convex-curved.

16. The exterior sideview mirror assembly of claim 15, wherein a part of said curved portion of said single mirror backing plate element is one of (a) substantially coplanar with said primary plane and (b) substantially rearward of said primary plane.

17. The exterior sideview mirror assembly of claim 15, wherein a first part of said curved portion of said single mirror backing plate element is substantially coplanar with said primary plane and a second part of said curved portion of said single mirror backing plate element is substantially rearward of said primary plane.

18. The exterior sideview mirror assembly of claim 10, wherein said main piano mirror element comprises a generally flat polymeric substrate having a thin glass element applied to a surface thereof and with an opposing surface thereof having a reflecting layer applied thereto, and wherein said generally flat polymeric substrate is formed from an elongated sheet of substrate material comprising a polymeric resin material, and wherein said elongated sheet has a substantially transparent functional film applied at a surface thereof, and wherein said substantially transparent functional film provides at least one of (a) an anti-abrasion function, (b) a hydrophobic function and (c) a hydrophilic function, and wherein said functional film comprises an ultrathin glass material which is sufficiently flexible to be provided in a reel or roll, and wherein said functional film is sufficiently flexible to conform to said generally flat polymeric substrate of said main piano mirror element, and said main piano mirror element comprises a reflective film disposed at a surface of said generally flat polymeric substrate opposite said substantially transparent functional film.

19. The exterior sideview mirror assembly of claim 18, wherein said thin glass element comprises a thin flexible glass sheet, said thin flexible glass sheet existing as a pre-formed glass sheet that is separate from said generally flat polymeric substrate, said thin flexible glass sheet having an attaching surface, said attaching surface being opposed to and adhered to said surface of said generally flat polymeric substrate when said thin flexible glass sheet is adhered to said exterior surface of said generally flat polymeric substrate, said thin flexible glass sheet providing an anti-abrasion function at said surface of said generally flat polymeric substrate when adhered thereto, said thin flexible glass sheet substantially conforming to said exterior surface of said generally flat polymeric substrate when adhered thereto, said thin flexible glass sheet having a thickness of less than approximately 0.8 mm and greater than approximately 0.3 mm.

20. The exterior sideview mirror assembly of claim 19, wherein said generally flat polymeric substrate is cut from a molded or extruded or cast elongated sheet, said thin flexible glass sheet being laminated to said elongated sheet and wherein said plano reflective element comprises a reflective film applied to an inner surface of said generally flat polymeric substrate opposite said exterior surface, and wherein said reflective film comprises a polymeric reflective film at least one of laminated, adhered and applied to said inner surface of said generally flat polymeric substrate.

21. The exterior sideview mirror assembly of claim 1, wherein said generally flat portion of said single mirror backing plate element defines a primary plane that is substantially flat and wherein said curved portion of said single minor backing plate element is substantially convex-curved.

22. The exterior sideview mirror assembly of claim 21, wherein a part of said curved portion of said single mirror backing plate element is one of (a) substantially coplanar with said primary plane and (b) substantially rearward of said primary plane.

23. The exterior sideview mirror assembly of claim 21, wherein a first part of said curved portion of said single mirror backing plate element is substantially coplanar with said primary plane and a second part of said curved portion of said single mirror backing plate element is substantially rearward of said primary plane.

24. An exterior sideview mirror assembly suitable for vehicular use, said exterior sideview minor assembly comprising:
  a minor housing defining a primary opening;
  a single mirror backing plate element within said mirror housing and disposed adjacent to said primary opening;
  said single mirror backing plate element movable by an electrically-operable actuator;
  a main piano minor element fixedly secured to and supported by said single mirror backing plate element and disposed within said primary opening for providing a view rearward of a vehicle equipped with said exterior sideview minor assembly through a first primary field of view;
  an auxiliary non-piano curved mirror element fixedly secured to and supported by said single mirror backing plate element and disposed adjacent to said main piano mirror element, wherein said auxiliary non-piano curved mirror element comprises a reflector-coated spherically curved substrate and has a spherical radius of curvature with substantially a single radius of curvature differing from said main piano mirror element such that said auxiliary non-piano curved mirror element provides a second auxiliary field of view rearward of the vehicle equipped with said exterior sideview mirror assembly;
  wherein said first primary field of view of said main piano mirror element overlaps said second auxiliary field of view of said auxiliary non-piano curved mirror element;
  wherein said single mirror backing plate element comprises a generally rigid polymeric molding able to support said main piano mirror element and said auxiliary non-piano curved mirror element;
  wherein said single mirror backing plate element comprises a generally flat portion for supporting said main piano mirror element and a curved portion for supporting said auxiliary non-piano curved mirror element;
  wherein said main piano mirror element is fixedly secured to said generally flat portion of said single mirror backing plate element and said auxiliary non-piano curved mirror element is fixedly secured to said curved portion of said single mirror backing plate;
  wherein said curved portion of said single mirror backing plate element for supporting said auxiliary non-piano curved mirror element is angled relative to said generally flat portion of said single mirror backing plate element for supporting said main piano mirror element in a manner such that, when a driver of a vehicle equipped with said exterior side view mirror assembly aligns the rearward field of view of said main piano mirror element, the rearward field of view of said main piano mirror element is aligned downwardly relative to a vehicle body side to which said exterior side view mirror assembly is attached;
  wherein said main piano mirror element comprises one of (a) a generally flat glass substrate having a surface coated with a metallic reflector coating and (b) a generally flat polymeric substrate having a thin glass element applied to a surface thereof and with an opposing surface thereof having a reflecting layer applied thereto; and
  wherein said curved portion of said single mirror backing plate element defines an auxiliary non-piano curved mirror element backing plate element radius of curvature substantially equal to said single radius of curvature.

25. The exterior sideview mirror assembly of claim 24, wherein said single mirror backing plate element includes a molded wall extending from a surface thereof; and wherein said wall generally circumscribes the circumferential edge of said auxiliary non-plano curved mirror element when said auxiliary non-plano curved mirror element is supported by said single mirror backing plate element.

26. The exterior sideview mirror assembly of claim 24, wherein said main plano mirror element comprises a generally flat glass substrate having a surface coated with a metallic reflector coating.

27. The exterior sideview mirror assembly of claim 24, wherein said main piano mirror element comprises a generally flat glass substrate having a surface coated with a metallic reflector coating and including a bracket configured for fixedly securing said exterior sideview mirror assembly to the vehicle body side.

28. The exterior sideview mirror assembly of claim 24, wherein said generally flat portion of said single mirror backing plate element defines a primary plane that is substantially flat and wherein said curved portion of said single mirror backing plate element is substantially convex-curved.

29. The exterior sideview mirror assembly of claim 28, wherein a part of said curved portion of said single mirror backing plate element is one of (a) substantially coplanar with said primary plane and (b) substantially rearward of said primary plane.

30. The exterior sideview mirror assembly of claim 28, wherein a first part of said curved portion of said single mirror backing plate element is substantially coplanar with said primary plane and a second part of said curved portion of said single minor backing plate element is substantially rearward of said primary plane.

31. An exterior sideview mirror assembly suitable for vehicular use, said exterior sideview mirror assembly comprising:
- a mirror housing defining a primary opening;
- a single mirror backing plate element within said minor housing and disposed adjacent to said primary opening; said single mirror backing plate element movable by an electrically-operable actuator;
- a main piano mirror element fixedly secured to and supported by said single mirror backing plate element and disposed within said primary opening for providing a view rearward of a vehicle equipped with said exterior sideview minor assembly through a first primary field of view;
- an auxiliary non-plano curved mirror element fixedly secured to and supported by said single minor backing plate element and disposed adjacent to said main piano minor element, said auxiliary non-plano curved minor element defined by a curvature differing from said main plano mirror element such that said auxiliary non-plano curved minor element provides a second auxiliary field of view rearward of the vehicle equipped with said exterior sideview minor assembly;
- wherein said auxiliary non-plano curved mirror element comprises a reflector-coated spherically curved substrate and has a spherical radius of curvature with substantially only one radius of curvature;
- wherein said first primary field of view of said main piano mirror element overlaps said second auxiliary field of view of said auxiliary non-plano curved mirror element;
- wherein said single mirror backing plate element comprises a generally rigid polymeric molding able to support said main piano mirror element and said auxiliary non-piano curved mirror element;
- wherein said single mirror backing plate element comprises a generally flat portion for supporting said main piano mirror element and a curved portion for supporting said auxiliary non-piano curved mirror element;
- wherein said main piano mirror element is fixedly secured to said generally flat portion of said single mirror backing plate element and said auxiliary non-piano curved mirror element is fixedly secured to said curved portion of said single mirror backing plate;
- wherein said curved portion of said single mirror backing plate element for supporting said auxiliary non-piano curved mirror element is angled relative to said generally flat portion of said single mirror backing plate element for supporting said main piano mirror element in a manner such that, when a driver of a vehicle equipped with said exterior side view mirror assembly aligns the rearward field of view of said main piano mirror element, the rearward field of view of said main plano mirror element is aligned downwardly relative to a vehicle body side to which said exterior side view mirror assembly is attached;
- wherein said main piano mirror element comprises one of (a) a generally flat glass substrate having a surface coated with a metallic reflector coating and (b) a generally flat polymeric substrate having a thin glass element applied to a surface thereof and with an opposing surface thereof having a reflecting layer applied thereto; and
- wherein said curved portion of said single mirror backing plate element defines an auxiliary non-piano curved mirror element backing plate element radius of curvature substantially equal to said substantially only one radius of curvature of said auxiliary non-plano curved mirror element.

32. The exterior sideview mirror assembly of claim 31, wherein said single mirror backing plate element includes a molded wall extending from a surface thereof and wherein said wall generally circumscribes the circumferential edge of said auxiliary non-piano curved mirror element when said auxiliary non-piano curved mirror element is supported by said single mirror backing plate element.

33. The exterior sideview mirror assembly of claim 31, wherein said main piano mirror element comprises a generally flat glass substrate having a surface coated with a metallic reflector coating.

34. The exterior sideview mirror assembly of claim 31, wherein said main piano mirror element comprises a generally flat glass substrate having a surface coated with a metallic reflector coating and including a bracket configured for fixedly securing said exterior sideview mirror assembly to the vehicle body side.

35. The exterior sideview mirror assembly of claim 31, wherein said generally flat portion of said single mirror backing plate element defines a primary plane that is substantially flat and wherein said curved portion of said single mirror backing plate element is substantially convex-curved.

36. The exterior sideview mirror assembly of claim 35, wherein a part of said curved portion of said single mirror backing plate element is one of (a) substantially coplanar with said primary plane and (b) substantially rearward of said primary plane.

37. The exterior sideview mirror assembly of claim 35, wherein a first part of said curved portion of said single mirror backing plate element is substantially coplanar with said primary plane and a second part of said curved portion of said single mirror backing plate element is substantially rearward of said primary plane.

* * * * *

UNITED STATES PATENT AND TRADEMARK OFFICE
CERTIFICATE OF CORRECTION

| | | |
|---|---|---|
| PATENT NO. | : 8,128,243 B2 | |
| APPLICATION NO. | : 12/911274 | |
| DATED | : March 6, 2012 | |
| INVENTOR(S) | : Niall R. Lynam | |

It is certified that error appears in the above-identified patent and that said Letters Patent is hereby corrected as shown below:

Column 6
Line 36, "faun" should be --form--
Line 37, "minor" should be --mirror--

Column 8
Line 26, "B" should be --E--

Column 9
Line 39, "stern" should be --stem--

Column 12
Line 5, "minor" should be --mirror--

Column 17
Line 13, "application" should be --applications--
Line 48, "example;" should be --example,--

Column 27
Line 56, Insert --embodiments of the-- after "the"
Line 56, Insert --in which an exclusive property or privilege is-- after "invention"
Line 56, Insert --are defined as follows:-- after "claimed"
Line 56, Delete "is" after "claimed"
Line 57, Claim 1, "minor" should be --mirror--

Column 28
Line 7, Claim 1, "minor" should be --mirror--
Line 7, Claim 1, "non-piano" should be --non-plano--
Line 9, Claim 1, "piano" should be --plano--
Line 10, Claim 1, "minor" should be --mirror--

Signed and Sealed this
Seventeenth Day of July, 2012

David J. Kappos
*Director of the United States Patent and Trademark Office*

CERTIFICATE OF CORRECTION (continued)
U.S. Pat. No. 8,128,243 B2

Line 12, Claim 1, "minor" should be --mirror--
Line 18, Claim 1, "piano" should be --plano--
Line 19, Claim 1, "non-piano" should be --non-plano--
Line 22, Claim 1, "piano" should be --plano--
Line 23, Claim 1, "non-piano" should be --non-plano--
Line 25, Claim 1, "non-piano" should be --non-plano--
Line 28, Claim 1, "piano" should be --plano--
Line 32, Claim 1, "piano" should be --plano--
Line 36, Claim 1, "piano" should be --plano--
Line 43, Claim 1, "non-piano" should be --non-plano--
Line 47, Claim 2, "piano" should be --plano--
Line 49, Claim 2, "non-piano" should be --non-plano--
Line 49, Claim 2, "minor" should be --mirror--
Line 52, Claim 3, "piano" should be --plano--
Line 65, Claim 6, "piano" should be --plano--

Column 29
Line 20, Claim 7, "piano" should be --plano--
Line 20, Claim 7, "piano" should be --plano--
Line 54, Claim 10, "minor" should be --mirror--
Line 58, Claim 10, "piano" should be --plano--
Line 66, Claim 10, "piano" should be --plano--
Line 67, Claim 10, "non-piano" should be --non-plano--

Column 30
Line 2, Claim 10, "non-piano" should be --non-plano--
Line 6, Claim 10, "piano" should be --plano--
Line 8, Claim 10, "non-piano" should be --non-plano--
Line 9, Claim 10, "mirror" should be --minor--
Line 11, Claim 10, "non-piano" should be --non-plano--
Line 16, Claim 10, "non-piano" should be --non-plano--
Line 18, Claim 10, "non-piano" should be --non-plano--
Line 24, Claim 10, "piano" should be --plano--
Line 25, Claim 10, "piano" should be --plano--
Line 29, Claim 10, "piano" should be --plano--
Line 36, Claim 10, "non-piano" should be --non-plano--
Line 41, Claim 11, "piano" should be --plano--
Line 42, Claim 11, "piano" should be --plano--
Line 43, Claim 11, "non-piano" should be --non-plano--
Line 51, Claim 12, "non-piano" should be --non-plano--
Line 54, Claim 13, "piano" should be --plano--

CERTIFICATE OF CORRECTION (continued)
U.S. Pat. No. 8,128,243 B2

Column 31
Line 13, Claim 18, "piano" should be --plano--
Line 20, Claim 18, "piano" should be --plano--
Line 20, Claim 18, "piano" should be --plano--
Line 61, Claim 21, "minor" should be --mirror--

Column 32
Line 8, Claim 24, "minor" should be --mirror--
Line 10, Claim 24, "minor" should be --mirror--
Line 15, Claim 24, "piano minor" should be --plano mirror--
Line 19, Claim 24, "mirror" should be --minor--
Line 21, Claim 24, "non-piano" should be --non-plano--
Line 23, Claim 24, "piano" should be --piano--
Line 24, Claim 24, "non-piano" should be --non-plano--
Line 28, Claim 24, "piano" should be --plano--
Line 29, Claim 24, "non-piano" should be --non-plano--
Line 32, Claim 24, "piano" should be --plano--
Line 34, Claim 24, "non-piano" should be --non-plano--
Line 37, Claim 24, "piano" should be --plano--
Line 38, Claim 24, "non-piano" should be --non-plano--
Line 41, Claim 24, "piano" should be --plano--
Line 42, Claim 24, "non-piano" should be --non-plano--
Line 45, Claim 24, "non-piano" should be --non-plano--
Line 49, Claim 24, "non-piano" should be --non-plano--
Line 52, Claim 24, "piano" should be --plano--
Line 55, Claim 24, "piano" should be --plano--
Line 56, Claim 24, "piano" should be --plano--
Line 60, Claim 24, "piano" should be --plano--
Line 67, Claim 24, "non-piano" should be --non-plano--

Column 33
Line 5, Claim 25, "thereof;" should be --thereof,--
Line 8, Claim 25, "non-piano" should be --non-plano--
Line 15, Claim 27, "piano" should be --plano--
Line 34, Claim 30, "minor" should be --mirror--
Line 40, Claim 31, "minor" should be --mirror--
Line 44, Claim 31, "piano" should be --plano--
Line 48, Claim 31, "minor" should be --mirror--
Line 51, Claim 31, "mirror" should be --minor--
Line 52, Claim 31, "piano" should be --plano--
Line 53, Claim 31, "mirror" should be --minor--
Line 53, Claim 31, "mirror" should be --minor--
Line 56, Claim 31, "mirror" should be --minor--
Line 58, Claim 31, "mirror" should be --minor--

CERTIFICATE OF CORRECTION (continued)
U.S. Pat. No. 8,128,243 B2

Line 59, Claim 31, "non-piano" should be --non-plano--
Line 63, Claim 31, "piano" should be --plano--
Line 68, Claim 31, "piano" should be --plano--

Column 34
Line 3, Claim 31, "piano" should be --plano--
Line 4, Claim 31, "non-piano" should be --non-plano--
Line 5, Claim 31, "piano" should be --plano--
Line 7, Claim 31, "non-piano" should be --non-plano--
Line 11, Claim 31, "non-piano" should be --non-plano--
Line 14, Claim 31, "piano" should be --plano--
Line 17, Claim 31, "piano" should be --plano--
Line 22, Claim 31, "piano" should be --plano--
Line 29, Claim 31, "non-piano" should be --non-plano--
Line 38, Claim 32, "non-piano" should be --non-plano--
Line 39, Claim 32, "non-piano" should be --non-plano--
Line 42, Claim 33, "piano" should be --plano--
Line 43, Claim 34, "piano" should be --plano--